US008793942B2

(12) United States Patent
Almy et al.

(10) Patent No.: US 8,793,942 B2
(45) Date of Patent: *Aug. 5, 2014

(54) PHOTOVOLTAIC ASSEMBLIES AND METHODS FOR TRANSPORTING

(71) Applicant: SunPower Corporation, San Jose, CA (US)

(72) Inventors: Charles Almy, Berkeley, CA (US); Matt Campbell, Berkeley, CA (US); Reuben Sandler, Berkeley, CA (US); Brian Wares, Sacramento, CA (US); Elizabeth Wayman, Emeryville, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,336

(22) Filed: Jun. 3, 2013

(65) Prior Publication Data

US 2013/0263913 A1      Oct. 10, 2013

Related U.S. Application Data

(63) Continuation of application No. 12/480,231, filed on Jun. 8, 2009, now Pat. No. 8,534,007.

(60) Provisional application No. 61/155,020, filed on Feb. 24, 2009.

(51) Int. Cl.
    *E04D 13/18*      (2014.01)
(52) U.S. Cl.
    USPC ................... 52/173.3; 136/245; 136/251
(58) Field of Classification Search
    USPC ............. 52/173.3; 136/246, 244, 251, 245; 248/460, 237, 462–464
    See application file for complete search history.

(56) References Cited

U.S. PATENT DOCUMENTS

| 923,500 A | * | 6/1909 | Drees | 108/36 |
| 1,888,117 A | * | 11/1932 | Fox | 108/133 |

(Continued)

FOREIGN PATENT DOCUMENTS

| DE | 3419299 | 11/1985 |
| ES | 2294903 | 4/2008 |

(Continued)

OTHER PUBLICATIONS

Non-Final Office Action from U.S. Appl. No. 12/480,231 mailed Sep. 12, 2012, 25 pgs.

(Continued)

*Primary Examiner* — Basil Katcheves
*Assistant Examiner* — Joshua Ihezie
(74) *Attorney, Agent, or Firm* — Blakely Sokoloff Taylor Zafman LLP

(57) ABSTRACT

A PV assembly including framework, PV laminate(s), and a stiffening device. The framework includes a perimeter frame at least 10 feet in length and at least 5 feet in width. The PV laminate(s) are assembled to the perimeter frame to define a receiving zone having a depth of not more than 8 inches. The stiffening device is associated with the framework and is configured to provide a first state and a second state. In the first state, an entirety of the stiffening device is maintained within the receiving zone. In the second state, at least a portion of the stiffening device projects from the receiving zone. The stiffening device enhances a stiffness of the PV assembly in a plane of the perimeter frame, and can include rods defining truss structures.

22 Claims, 24 Drawing Sheets

(56) References Cited

U.S. PATENT DOCUMENTS

| | | | |
|---|---|---|---|
| 3,037,215 A * | 6/1962 | Pile | 5/111 |
| 4,149,523 A | 4/1979 | Boy-Marcotte et al. | |
| 4,151,872 A * | 5/1979 | Slysh et al. | 160/213 |
| 4,421,943 A * | 12/1983 | Withjack | 136/246 |
| 4,429,178 A | 1/1984 | Prideaux et al. | |
| 4,433,200 A * | 2/1984 | Jester et al. | 136/251 |
| 4,452,234 A * | 6/1984 | Withjack | 126/627 |
| 4,552,125 A * | 11/1985 | Borodulin et al. | 126/640 |
| 4,555,084 A * | 11/1985 | Anderson et al. | 248/460 |
| 4,765,309 A | 8/1988 | Legge | |
| 5,228,924 A | 7/1993 | Barker et al. | |
| 5,288,337 A * | 2/1994 | Mitchell | 136/246 |
| 5,325,793 A * | 7/1994 | Martin | 108/130 |
| 5,660,117 A * | 8/1997 | Noble | 108/35 |
| 5,833,178 A * | 11/1998 | Plasse et al. | 248/27.8 |
| 6,000,663 A * | 12/1999 | Plasse et al. | 248/27.8 |
| 6,044,758 A * | 4/2000 | Drake | 100/43 |
| 6,058,930 A | 5/2000 | Shingleton | |
| 6,076,472 A * | 6/2000 | Lloyd | 108/36 |
| 6,111,189 A * | 8/2000 | Garvison et al. | 136/244 |
| 6,201,181 B1 * | 3/2001 | Azzam et al. | 136/244 |
| 6,431,086 B1 * | 8/2002 | Lloyd | 108/36 |
| 6,563,040 B2 * | 5/2003 | Hayden et al. | 136/244 |
| 6,645,031 B2 * | 11/2003 | Gelfond et al. | 446/73 |
| 6,809,251 B2 * | 10/2004 | Dinwoodie | 136/251 |
| 6,959,517 B2 * | 11/2005 | Poddany et al. | 52/173.3 |
| 7,230,819 B2 * | 6/2007 | Muchow et al. | 361/601 |
| 7,390,961 B2 | 6/2008 | Aschenbrenner et al. | |
| 7,531,741 B1 * | 5/2009 | Melton et al. | 136/246 |
| 7,610,863 B1 * | 11/2009 | Smith-Huebner | 108/36 |
| 7,658,055 B1 | 2/2010 | Adriani et al. | |
| 8,254,090 B2 * | 8/2012 | Prax et al. | 361/641 |
| 2004/0194677 A1 * | 10/2004 | Degen et al. | 108/132 |
| 2004/0244656 A1 * | 12/2004 | Shenghao et al. | 108/132 |
| 2004/0255829 A1 * | 12/2004 | Cizmar et al. | 108/132 |
| 2007/0151594 A1 | 7/2007 | Mascolo et al. | |
| 2007/0272128 A1 * | 11/2007 | Lin | 108/115 |
| 2008/0068782 A1 * | 3/2008 | Muchow et al. | 361/601 |
| 2008/0196758 A1 * | 8/2008 | McGuire | 136/245 |
| 2009/0078174 A1 * | 3/2009 | Larcom et al. | 108/169 |
| 2009/0301358 A1 * | 12/2009 | Farber et al. | 108/36 |
| 2011/0309215 A1 * | 12/2011 | Lu et al. | 248/165 |
| 2012/0024203 A1 * | 2/2012 | Winter et al. | 108/132 |
| 2012/0111242 A1 * | 5/2012 | Branch et al. | 108/167 |
| 2012/0199050 A1 * | 8/2012 | Neunzert et al. | 108/50.11 |
| 2012/0210915 A1 * | 8/2012 | Branch et al. | 108/167 |

FOREIGN PATENT DOCUMENTS

| | | |
|---|---|---|
| JP | 60-169173 | 9/1985 |
| JP | 2007-224538 | 9/2007 |
| WO | 0012839 | 3/2000 |
| WO | 2007/038760 | 4/2007 |
| WO | 2007/128401 | 11/2007 |

OTHER PUBLICATIONS

International Search Report and Written Opinion from PCT/US2009/069148 mailed May 20, 2010, 17 pgs.

Shugar, et al., "Design and Prototype of a Minimal Cost Tracking Photovoltaic Array Structure," Proceedings of the American Solar Energy Society Conference, Solar '95, Jul. 1995, 6 pgs.

First Notification to Make Rectification from Chinese Patent Application No. 200990100711.9 mailed Aug. 8, 2012, 2 pgs.

Pvstrom, brochure entitled "Powertracker," 2008, 12 pgs.

Shingleton, J. , One-Axis Trackers—Improved Reliability, Durability, Performance, and Cost Reduction, (Feb. 2008), 56 pg.

* cited by examiner

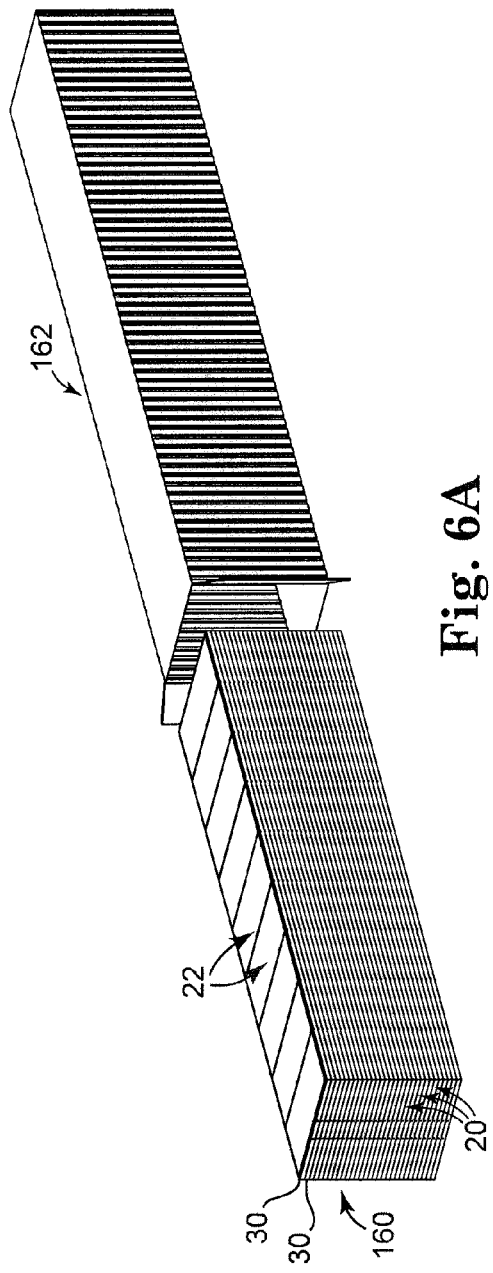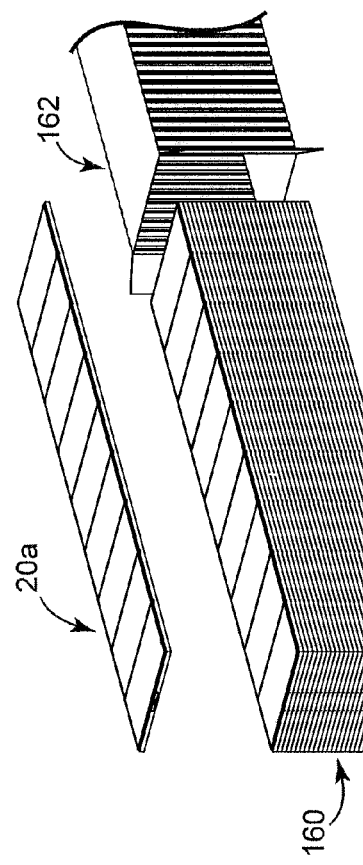

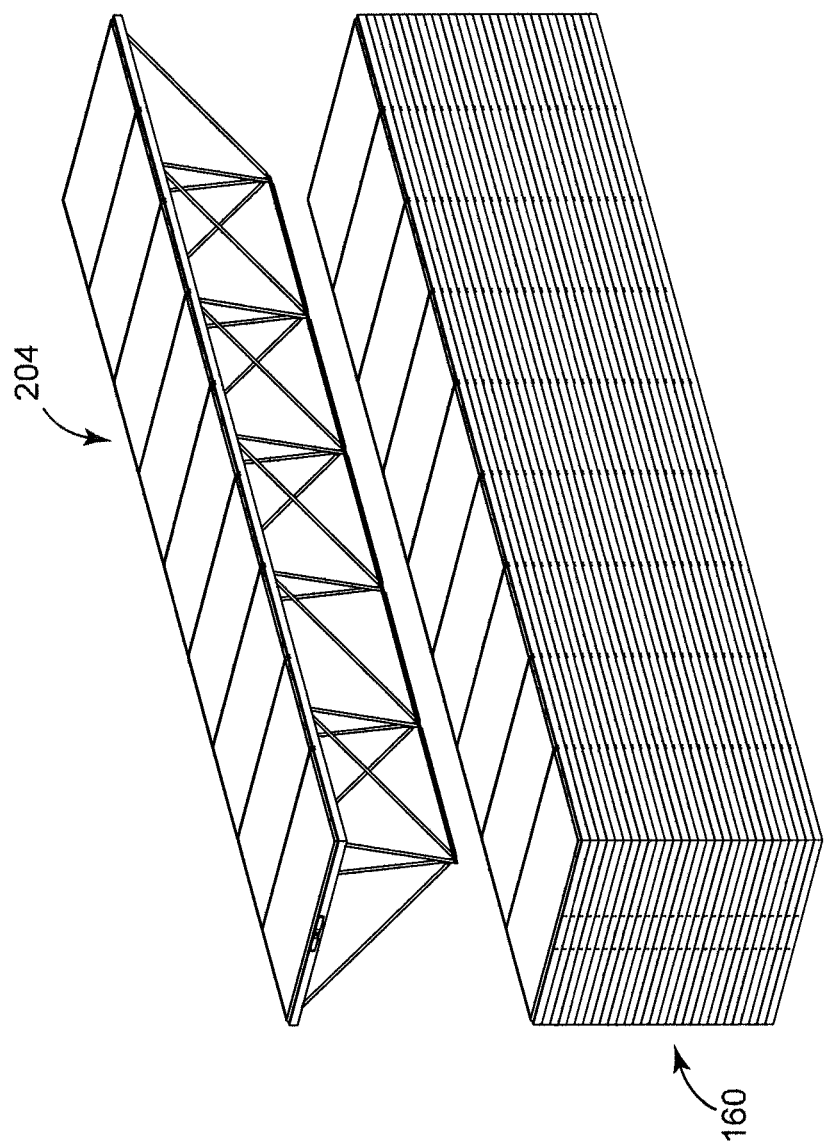

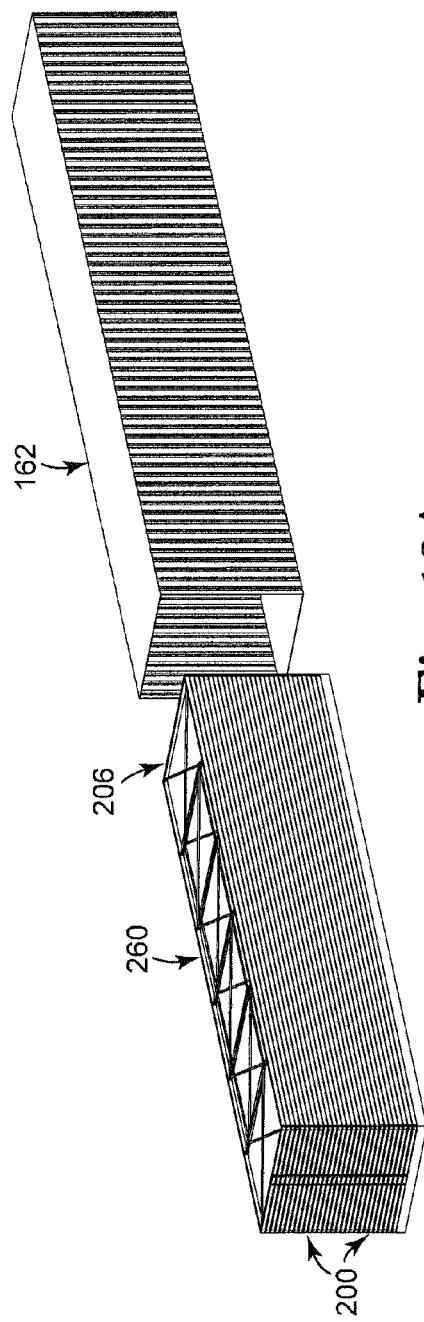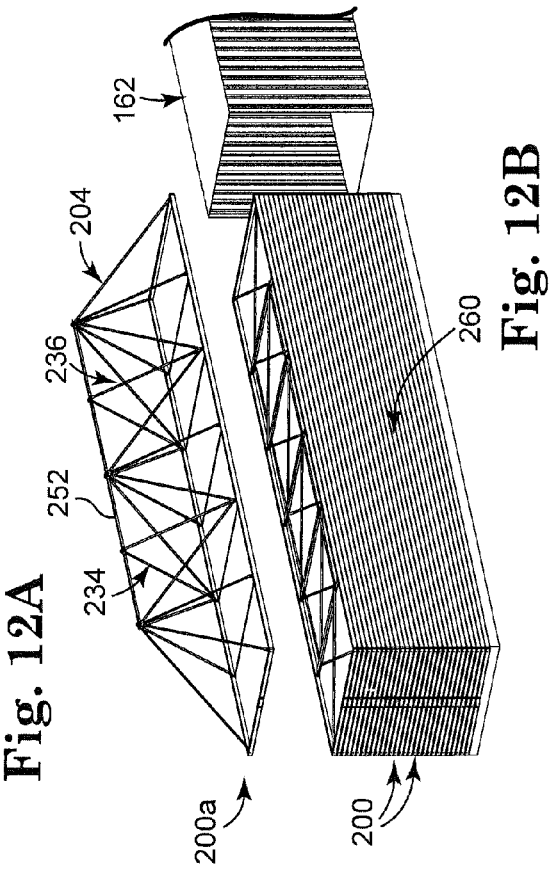
Fig. 12A
Fig. 12B

PHOTOVOLTAIC ASSEMBLIES AND METHODS FOR TRANSPORTING

CLAIM OF US PRIORITY

This application is a continuation of U.S. patent application Ser. No. 12/480,231, filed Jun. 8, 2009, which claims priority under 35 U.S.C. §119(e)(1) to U.S. Provisional Patent Application Ser. No. 61/155,020, filed Feb. 24, 2009, entitled "Photovoltaic Assemblies and Methods for Transporting", and bearing; and the entire teachings of which are incorporated herein by reference.

STATEMENT REGARDING FEDERALLY SPONSORED RESEARCH OR DEVELOPMENT

This disclosure was made with Government support under Contract No. DE-FC36-07GO17043 awarded by the United States Department of Energy. The Government has certain rights in this disclosure.

BACKGROUND

The present disclosure relates to ground mount-type solar energy collectors. More particularly, it relates to compact, ground mount photovoltaic assemblies facilitating low cost shipment to, and installation at, a large scale solar energy collection site.

Solar power has long been viewed as an important alternative energy source. To this end, substantial efforts and investments have been made to develop and improve upon solar energy collection technology. Of particular interest are large scale installations in which numerous solar energy collectors are arranged over a sizeable area (on the order of at least one square mile) and collect significant amounts of solar energy (on the order of megawatts or even gigawatts).

Solar photovoltaic technology is generally viewed as an optimal approach for large scale solar energy collection, and can be used as a primary and/or secondary energy source. In general terms, solar photovoltaic systems (or simply "photovoltaic systems") employ photovoltaic (PV) cells made of silicon or other materials (e.g., CdTe, CIGS, etc.) to convert sunlight into electricity. The cells are packaged in a PV laminate that is generally formed as an array of crystalline or amorphous semiconductor devices electrically interconnected and encapsulated. One or more electrical conductors are carried by the PV laminate through which the solar-generated current is conducted. A single PV laminate can then be assembled to a supportive frame to form a PV module, or can be supported directly (alone or with one or more additional PV laminates) without the use of a frame. As used throughout this specification, the term "PV assembly" (or "photovoltaic assembly") generically encompasses one or more PV laminates, or one or more PV modules, assembled to a common support structure. With this in mind, photovoltaic installations typically include a plurality of PV assemblies arranged in rows, with the PV laminates or modules of adjacent assemblies interconnected with wiring to one or more appropriate electrical components (e.g., switches, inverters, junction boxes, etc.).

Regardless of an exact construction of the PV assembly, most large scale PV installations entail mounting an array of PV assemblies to the earth or ground at a location where sunlight is readily present. In an open environment, the PV assemblies are oftentimes subjected to significant wind forces. These forces are especially problematic in with large scale solar energy collection applications in which the PV assemblies are preferably created to be as large as possible to maximize PV density. The correspondingly large support structure necessary to support these massive PV laminates or modules (or series of PV laminates or modules) is thus more susceptible to failure in the presence of wind forces (or other harsh environmental conditions). To better ensure long-term integrity, then, ground mount-type PV assemblies will include robust, complex stiffening components and/or wind deflectors that serve to off-set expected wind gusts. Moreover, for installations in which the PV laminates or modules are tilted relative to the sky (i.e., off-set from a horizontal orientation) and/or are rotated during the daylight hours by a separate tracking system, the need for augmented stiffening or reinforcement of the PV laminate/support structure interface is heightened.

In light of the above, while viable PV assembly designs are available for large scale applications, certain drawbacks remain. For example, conventional ground mount PV assembly configurations are commonly delivered to the installation site in an unassembled state, and the installer is required to invest significant worker hours in assembling the PV laminate(s) or module(s) to the separate support structure and stiffening members. Conversely, while some PV assembly designs are delivered in a pre-assembled state, the shipping footprint associated with the product is relatively high and/or irregular, and thus overtly impedes dense packaging of multiple ones of the PV assemblies in a shipping container. Instead, for a large scale installation, an excessively large number of transport vehicles are necessary to deliver the correspondingly large number of PV assembly shipping containers, increasing shipping and handling costs. A corresponding concern relates to the environmental and aesthetic impact of having a massive number of trucks travelling to and from the installation site. Clearly, installers greatly desire to minimize costs and environmental impact as much as possible.

In light of the above, a need exists for an improved PV assembly for large scale solar energy collection installations with requisite structural integrity that can be shipped pre-assembled in a reduced shipping footprint or envelope.

SUMMARY

One aspect of the present disclosure relates to a PV assembly including framework, one or more PV laminates, and a stiffening device. The framework includes a perimeter frame defining a length of at least 10 feet, a width of at least 5 feet, and a height. The perimeter frame includes a PV support section having first and second PV support faces each defining a plane. The PV laminate(s) are assembled to the perimeter frame and collectively defines a PV front surface and a PV rear surface. In this regard, the PV laminate(s) are positioned such that the PV front surface is proximate the first PV support face plane, and the PV rear surface is spaced from the second PV support face plane to define a receiving zone bounded by the frame and the second PV support face plane. The receiving zone has a depth of not more than 8 inches. The stiffening device is associated with the framework and is configured to provide a first state and a second state. In the first state, an entirety of the stiffening device is maintained within the receiving zone. In the second state, at least a portion of the stiffening device projects from the receiving zone beyond the second PV support face plane, and enhances a stiffness of the PV assembly in a plane of the perimeter frame as compared to a stiffness of the PV assembly in the first state. In the second state, then, the framework and the stiffening device combine to form a support structure for mounting the PV assembly to earth. In some embodiments, the stiffening device includes a plurality of rods that define at least one truss structure in the second state. For example, the plurality of rods can include first and second rod sets assembled to opposing side members of the perimeter frame, respectively, with leading ends of at least one of the rod sets being coupled to one another in the second state. In related embodiments, the rod sets are pivotably coupled to the perimeter frame, and are thus foldable relative to the perimeter frame between the first and second states. In other embodiments, the perimeter frame further includes a skirt section extending from the PV support section and configured to enhance overall stiffness as well as provide a nesting feature, with a resultant stacking pitch of the perimeter frame being not more than 8 inches.

Other aspects in accordance with the present disclosure relate to a shippable PV kit, for example for large scale solar energy collection applications. The PV kit includes a plurality of PV assemblies and a cargo shipping container. Each of the PV assemblies is configured as described above, and the cargo shipping container is sized to contain the plurality of PV assemblies in a stacked arrangement. In some embodiments, the stacked arrangement includes each of the PV assemblies arranged in the first state, with perimeter frames of adjacent PV assemblies in abutting, nested contact. With this construction, the cargo container is conventionally sized for transport by ship or truck, and optionally has a shipping density of at least 100 kWp per container in some embodiments.

Yet other aspects in accordance with the present disclosure relate to a method for delivering PV assemblies to an installation site, such as a large scale solar energy collection site. The method includes providing a plurality of PV assemblies as described above. The plurality of PV assemblies are arranged in the first state and loaded into a cargo shipping container in a stacked arrangement. The loaded container is transported to an installation site at which the plurality of PV assemblies are unloaded from the container and then individually removed from the stacked arrangement.

BRIEF DESCRIPTION OF THE DRAWINGS

FIG. 6A is a perspective view of a stacked arrangement of the photovoltaic assemblies of FIGS. 1A and 1B being loaded to a cargo shipping container;

FIG. 6B is a perspective view of the stacked arrangement of FIG. 6A, and further illustrating removal of an uppermost photovoltaic assembly from the stacked arrangement;

FIG. 6C is a perspective view of the uppermost photovoltaic assembly and the stacked arrangement of FIG. 6B, including the uppermost photovoltaic assembly transitioned to the deployed state;

FIG. 12A is a perspective view of a stacked arrangement of the photovoltaic assemblies of FIGS. 8A and 8B being loaded to a cargo shipping container;

FIG. 12B is a perspective view of the stacked arrangement of FIG. 12A, and further illustrating removal of an uppermost photovoltaic assembly from the stacked arrangement;

DETAILED DESCRIPTION

Figure 1A:
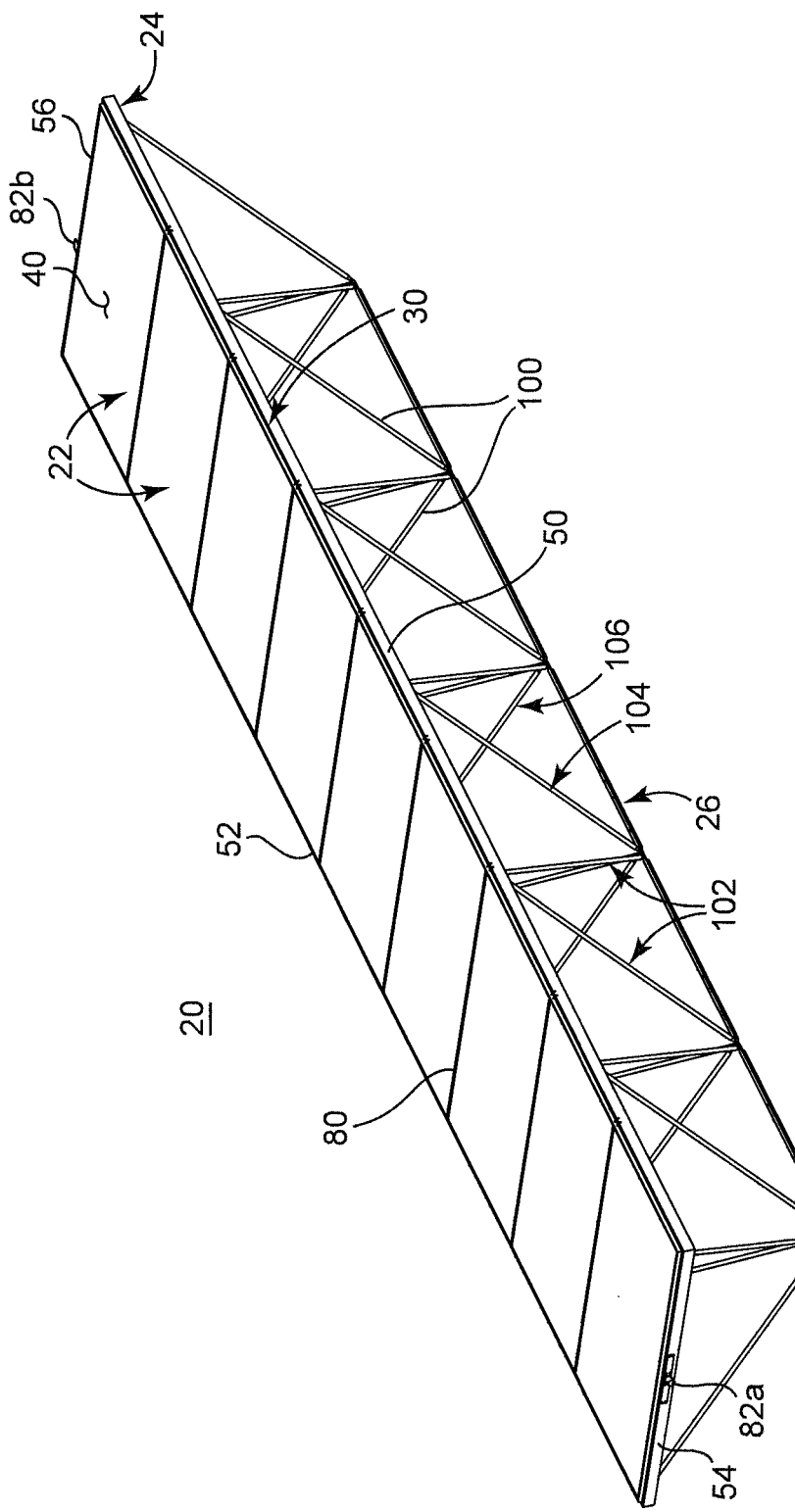
FIG. 1A is a bottom perspective view of a photovoltaic assembly in accordance with principles of the present disclosure, including a stiffening device in a deployed state.
Figure 1B:
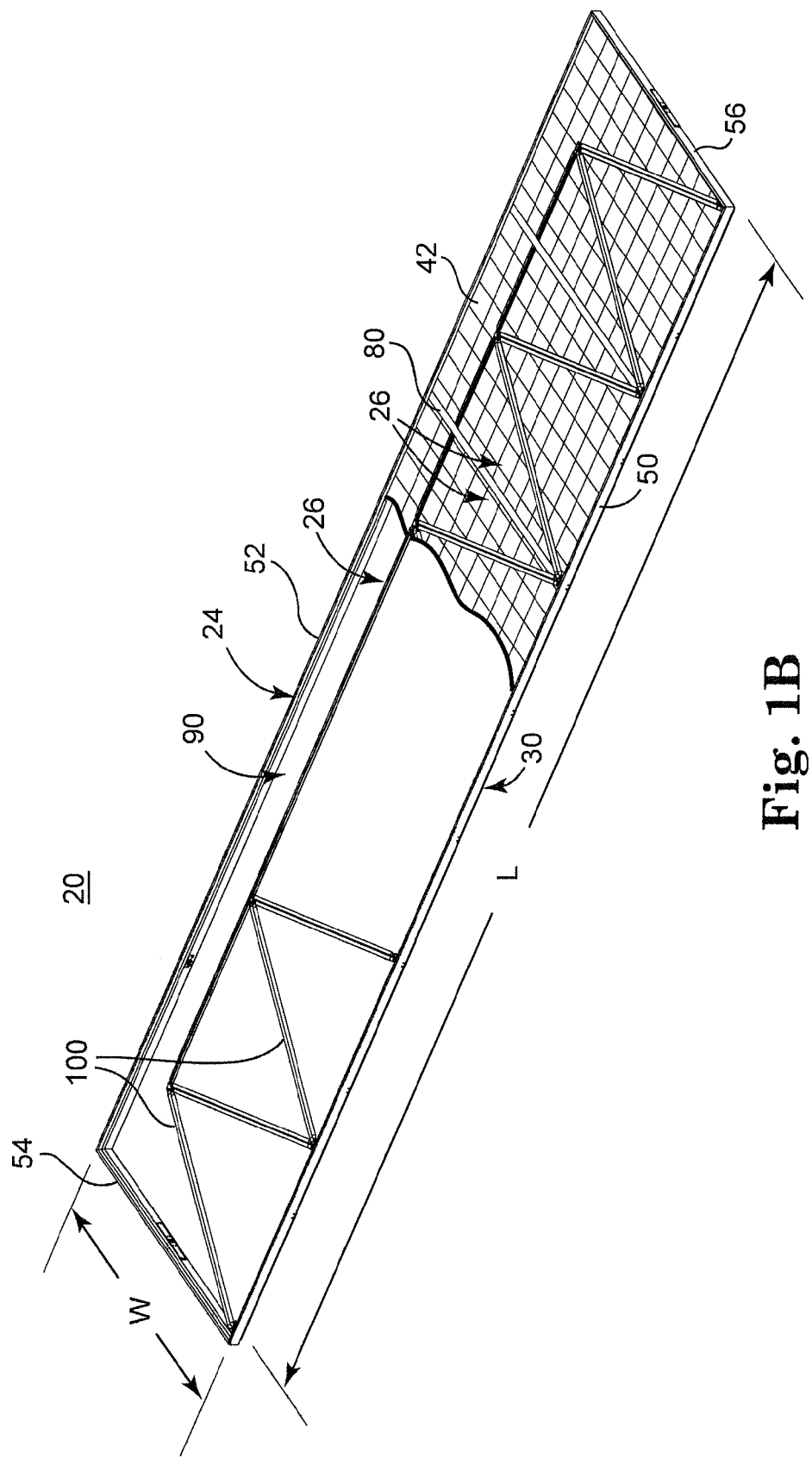
FIG. 1B is a top perspective view of the photovoltaic assembly of FIG. 1A, with the stiffening device in a shipping state.

One embodiment of a photovoltaic (PV) assembly 20 in accordance with principles of the present disclosure and useful, for example, with a large scale solar energy collection installation is shown in FIGS. 1A and 1B. The PV assembly 20 includes one or more PV laminates 22, framework 24, and a stiffening device 26. Details on the various components are provided below. In general terms, however, the PV laminates 22 are assembled to, and encased by, a perimeter frame 30 of the framework 24. The stiffening device 26 is associated with the framework 24, and is coupled to the perimeter frame 30 in at least a deployed state of FIG. 1A. Further, the stiffening device 26 is transitionable to a shipping state of FIG. 1B in which an entirety of the stiffening device 26 is disposed within the confines of a pitch of the perimeter frame 30. In this shipping state, the PV assembly 20 is highly compact, and is readily stacked to or with additional, similar PV assemblies in achieving high container shipping density. Further, when delivered to an installations site, the PV assembly 20 is readily transitioned from the shipping state of FIG. 1B to the deployed state of FIG. 1A for mounting to a desired structure, such as the ground. In the deployed state, the stiffening device 26 enhances a stiffness or rigidity of the PV assembly 20 in a plane of the perimeter frame 30 to levels sufficient for long-term structural integrity in the presence of repeated wind gusts.

The PV laminate(s) 22 can assume a variety of forms that may or may not be implicated by FIGS. 1A and 1B. For example, the PV laminate 22, can have any form currently known or in the future developed that is otherwise appropriate for use as a solar photovoltaic device. Further, the PV assembly 20 can consist of a single, large PV laminate 22 or a plurality of PV laminates 22 combining to define a large PV laminate arrangement. In general terms, the PV laminate 22 consists of an array of photovoltaic cells. A glass laminate may be placed over the photovoltaic cells for environmental protection. In some embodiments, the photovoltaic cells advantageously comprise backside-contact cells, such as those of the type available from SunPower Corp., of San Jose, Calif. As a point of reference, in backside-contact cells, wirings leading to external electrical circuits are coupled to a backside of the cell (i.e., the side facing away from the sun upon installation) for increased solar collection area. Backside-contact cells are also disclosed in U.S. Pat. Nos. 5,053,083 and 4,927,770, which are both incorporated herein by reference in their entirety. Other types of photovoltaic cells may also be used without detracting from the merits of the present disclosure. For example, the photovoltaic cells can incorporate thin film technology, such as silicon thin films, non-silicon devices (e.g., III-V cells including GaAs), etc. Further, the PV laminate 22 can be bifacial.

While not shown in the Figures, additional components can be provided with each of the PV laminates 22, such as wiring or other electrical components. Further, the PV laminates 22 can be mounted to or maintained by framing components apart from the framework 24. Thus, for example, one or more of the PV laminates 22 can be provided as a standalone PV module (as that term is conventionally employed) and subsequently assembled to the framework 24.

Figure 2:
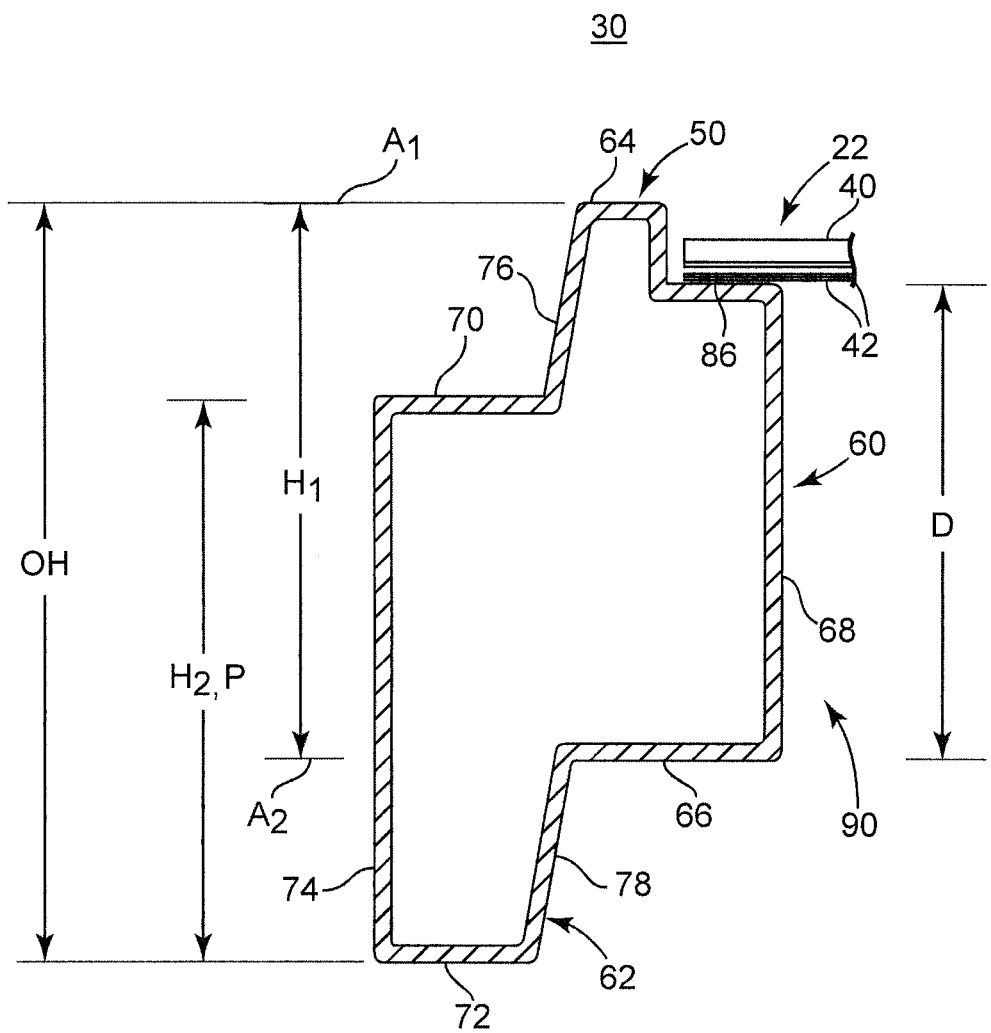
FIG. 2 is an enlarged, cross-sectional view of a portion of the photovoltaic assembly of FIG. 1A, with the stiffening device removed.

Regardless of an exact construction, the PV laminate 22 defines a PV front surface 40 and a PV rear surface 42 (best shown in FIG. 2). As a point of reference, additional components (where provided) associated with the PV laminate 22 are conventionally located at or along the PV rear surface 42, and are otherwise omitted from the views. Further, where the PV assembly 20 includes two or more of the PV laminates 22, the PV laminates 22 combine to collectively define the PV front surface 40 and the PV rear surface 42 (i.e., the PV laminates 22 are co-planar with one another).

With the above understanding of the PV laminate(s) 22 in mind, the framework 24 generally includes the perimeter frame 30 adapted to maintain and encompass a perimeter of the PV laminate(s) 22. The perimeter frame 30 can form a variety of shapes, and in some embodiments defines the PV assembly 20 to be rectangular. Thus, the perimeter frame 30 can include opposing, first and second side frame members 50, 52 and opposing, first and second end frame members 54, 56. With embodiments in which the perimeter frame 30 is rectangular, the side frame members 50, 52 are identical, and define a length L of the PV assembly 20 as reflected in FIG. 1B. Similarly, the end members 54, 56 are identical, and define a width W of the PV assembly 20. The length L and width W dimensions, and thus a size/area of the PV laminate(s) 22 (and associated output capacity) retained by the perimeter frame 30, are relatively large. For example, in some configurations, the length L is not less than 10 feet; alternatively not less than 12 feet; and in other configurations not less than 15 feet. The width W is not less than 5 feet; alternatively, not less than 6 feet. Notably, however, in some embodiments, the length L and width W dimensions are selected so as to not exceed the length and width dimensions associated with conventional cargo shipping containers (otherwise used in transporting product by ship, train, truck, etc.).

Apart from the dimensional variations described above, the perimeter frame members 50-56 can be identical. For example, the frame members 50-56 are formed of a strong, rigid material (e.g., steel or aluminum beams or tubes). The first side frame member 50 is shown in cross-section in FIG. 2, and includes or forms a PV support section 60 and an optional skirt section 62. As described in greater detail below, the PV support section 60 serves to maintain the PV laminate(s) 22 as well as the stiffening device 26 (omitted from the view of FIG. 2, but shown in FIGS. 1A and 1B). The skirt section 62, where provided, serves to enhance an overall stiffness of the perimeter frame 30, as well as providing a stacking feature.

The PV support section 60 forms or defines opposing, first and second PV support faces 64, 66, as well as an interior face 68. In some constructions, the PV support faces 64, 66 are arranged in a parallel fashion, with the interior face 68 extending perpendicular thereto. Regardless, the frame members 50-56 are spatially aligned with one another, such that the corresponding first PV support faces 64 combine to define a common, first PV support face plane $A_1$, and the second PV support faces 66 combine to define a common, second PV support face plane $A_2$. Further, a first height $H_1$ is defined by the linear distance or dimension between the PV support faces 64, 66 (and thus between the PV support face planes $A_1$, $A_2$).

The optional skirt section 62 projects outwardly from the PV support section 60 relative to the interior face 68, and forms opposing, first and second reinforcement faces 70, 72, as well as an exterior face 74. The first reinforcement face 70 is, in some embodiments, arranged parallel relative to the first and second PV support faces 64, 66, and is located between the first and second PV support face planes $A_1$, $A_2$. The second reinforcement face 72 is spaced from the second PV support face 66, in a direction opposite the first PV support face 64 (i.e., "below" the second PV support face 66 relative to the orientation of FIG. 2). A second height $H_2$ is defined by the linear distance between reinforcement faces 70, 72. With this construction, the PV support section 60 and the skirt section 62 combine to define an overall height OH of the frame members 50-56, and thus of the perimeter frame 30 as a whole. More particularly, the overall height OH is formed as a linear distance between the second reinforcement face 72 and the first PV support face 64 (or the first support face plane $A_1$). With the one configuration of FIG. 2, then, the overall height OH is greater than the height $H_1$ of the PV support section 60. This, in turn, enhances an overall stiffness of the perimeter frame 30 via additional bending moment resistance by increasing the second moment of inertia (relative to a configuration in which the overall height OH is fully confined to the PV support section height $H_1$). In fact, with alternative constructions in accordance with the present disclosure, the skirt section 62 can be greatly enlarged to sufficiently stiffen the perimeter frame 30 to levels at which the stiffening device 26 is no longer necessary and can be eliminated. In other embodiments described below, however, the frame members 50-56 can be configured such that the PV support section height and the overall height OH are identical.

The frame members 50-56 can further incorporate features that facilitate nesting or stacking of the perimeter frame 30 to another, identically formed perimeter frame. More particularly, the PV support section 60 can include or form a first nesting face 76, whereas the skirt section 62 forms a second nesting face 78. The first nesting face 76 extends in an angular fashion between the first PV support face 64 and the first reinforcement face 70. The second nesting face 78 extends in a similar angular fashion between the second reinforcement face 72 and the second PV support face 66. Further, the nesting faces 76, 78 are spatially arranged in a generally overlapping manner. Regardless of the shape and/or form of the optional nesting faces 76, 78, the perimeter frame 30 is stackable onto a separate, identically formed perimeter frame 30, with an effective stacking height of the perimeter frame 30 being characterized by a pitch P. The stacked arrangement is described in greater detail below. In general terms, however, the pitch P is the linear distance between opposing load bearing surfaces provided by the perimeter frame 30 when stacked, with the load bearing surfaces being defined as an uppermost surface of the perimeter frame 30 against which a load of a photovoltaic assembly stacked onto the perimeter frame 30 is primarily supported, and a lowermost surface of the perimeter frame 30 that is primarily supported by a photovoltaic assembly onto which the perimeter frame 30 is stacked. For example, with the one configuration of FIG. 2, the height $H_2$ of the skirt section 62 is greater than the height $H_1$ of the PV support section 60, such that the skirt section height $H_2$ is also the pitch P, and the reinforcement faces 70, 72 serve as the load bearing surfaces as made clear below. Alternatively, the perimeter frame 30 can be configured such that the PV support section height $H_1$ is greater than the skirt section height $H_2$. With this construction, the pitch P is the PV support section height $H_1$, with the PV support faces 64, 66 serving as the load bearing surfaces. In yet other constructions, the perimeter frame 30 can be configured such that the first PV support face 64 and the second reinforcement face 72 serve as the opposing, load bearing surfaces, with the pitch P then being the overall height OH.

With the above explanation of the pitch P in mind, the pitch P establishes a stacking depth for the PV assembly 20 (FIG. 1A), during shipping, and is not greater than 8 inches with some configurations. Alternatively, the pitch P is not greater than 5 inches; alternatively, not greater than 4 inches. In yet other embodiments, the pitch P is on the order of 3 inches.

Figure 3:
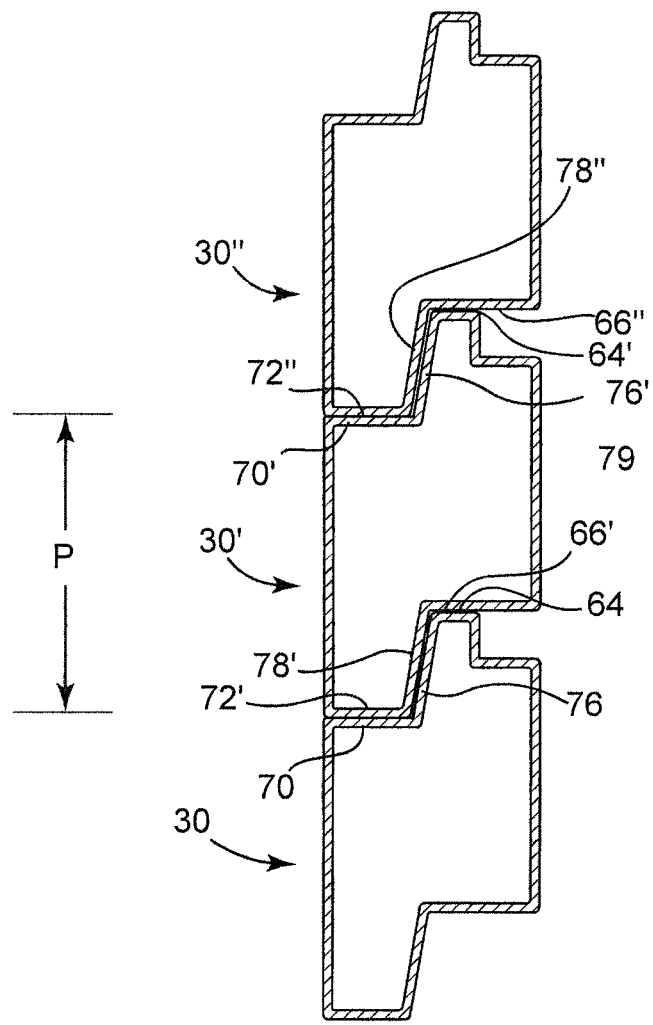
FIG. 3 is a schematic, cross-sectional view of frame members of three of the photovoltaic assemblies of FIG. 1A in a stacked arrangement.

As shown in FIG. 3, individual perimeter frames 30, and thus the corresponding PV assemblies 20 (FIG. 1A) are readily stacked or nested to one another. For example, FIG. 3 illustrates a stacked arrangement of the corresponding frame members of first-third perimeter frames 30-30". The second perimeter frame 30' is nested onto the first perimeter frame 30, with the first reinforcement face 70 of the first perimeter frame 30 abutting and supporting the second reinforcement face 72' of the second perimeter frame 30'. A load of the second perimeter frame 30' is primarily supported by the first perimeter frame 30 at the first reinforcement face 70/second reinforcement face 72' interface, such that the reinforcement faces 70, 72' serve as load bearing surfaces. Further, the first nesting face 76 of the first perimeter frame 30 is aligned with, and nests against, the second nesting face 78' of the second perimeter frame 30'. A similar stacked or nested, abutting relationship is provided between the first reinforcement face 70' and the first nesting face 76' of the second perimeter frame 30' relative to the, the second reinforcement face 72" and the second nesting face 78" of the third perimeter frame 30", respectively. Once again, a load of the third perimeter frame 30" is primarily supported by the second perimeter frame 30' at the first reinforcement face 70'/second reinforcement face 72" interface, such that the reinforcement faces 70', 72" serve as load bearing surfaces. Relative to each of the individual perimeter frame (e.g., the second perimeter frame 30') because a linear distance between the PV support faces (e.g., the PV support faces 64', 66') is less than a distance between the reinforcement faces (e.g., the reinforcement faces 70', 72') a gap is formed between PV support faces of adjacent perimeter frames in the stacked arrangement (e.g., a gap 79 is formed between the first PV support face 64 of the first perimeter frame 30 and the second PV support face 66' of the second perimeter frame 30').

With the above arrangement, the effective vertical space occupied by each of the stacked perimeter frames 30-30" is limited to the corresponding pitch P. In other words, the perimeter frames 30-30" each incorporate the enhanced stiffness characteristics due to the elevated overall height OH (FIG. 2) as described above; yet in the stacked arrangement, require a reduced amount of vertical space (i.e., a vertical space that is less than the overall height OH). As a result, a greater number of the perimeter frames 30 (and thus of the PV assemblies 20) can be stored in a confined space as compared to configurations that do not incorporate nesting features.

As mentioned above, the perimeter frames 30-30" can alternatively be configured such that the PV support faces 62, 64 serve as the load bearing surfaces. For example, relative to the first perimeter frame 30, the linear distance between the PV support faces 62, 64 can be greater than the linear distance between the reinforcement face 70, 72. Under these circumstances, the pitch P of the perimeter frame 30 is the distance between the PV support faces 62, 64 (i.e., the PV support section height $H_1$ of FIG. 2), yet the same benefits described above (e.g., enhanced stiffness with reduced stacking height) are met.

Returning to FIGS. 1A and 1B, the perimeter frame 30 serves as the primary support structure for the PV laminate(s) 22. Optionally, one or more intermediate cross beams 80 can be provided with the framework 24, extending between and interconnecting the side frame members 50, 52 (e.g., parallel to the end frame members 54, 56). Additional features can also be provided including, for example, shafts 82a, 82b projecting from the end frame members 54, 56, respectively, that facilitate mounting of the PV assembly 20 to a support structure and/or tracking system as described below. Other additional framework components can be provided and/or one or both of the shafts 82a, 82b omitted.

Embodiments of the stiffening device 26 are described in greater detail below. In general terms, however, configurations of the stiffening device 26 are premised upon selective arrangement of an entirety of the stiffening device 26 within a depth of the perimeter frame 30 PV in the shipping state, as well as the requisite strengthening of the PV assembly 20 in the deployed state. For example, FIG. 2 illustrates assembly of the PV laminate(s) 22 to the perimeter frame 30, and in particular relative to one configuration of the first side frame member 50. The PV laminate(s) 22 is assembled to the perimeter frame 30 such that the PV front surface 40 is at or immediately proximate the first PV support face 64 (and thus the first PV support face plane $A_1$). The PV rear surface 42 is opposite the first PV support face 64, but is spaced from the second PV support face 66 (and thus the second PV support face plane $A_2$). As a result, the perimeter frame 30 and the PV laminate(s) 22 combine to define a receiving zone 90 that is laterally bounded by the perimeter frame members 50-56 and spatially terminates in the second PV support face plane $A_2$. The receiving zone 90 can be described as extending to the PV rear surface 42. Alternatively, the receiving zone 90 can be defined apart from the PV rear surface 42, for example via the cross beams 80 (FIG. 1A) that are otherwise positioned commensurate with a mounting ledge 86 formed with the perimeter frame members 50-56 for receiving the PV laminates 22 (e.g., FIG. 2 reflects the first end frame member 54 as including the mounting ledge 86). Regardless, the receiving zone 90 provides an open volume having a depth D within which the stiffening device 26 (FIG. 1A) is fully stored in the shipping state of the PV assembly 20.

The depth D of the receiving zone 90 is not greater than, and is normally less than, the pitch P of the perimeter frame 30 (it being recalled that the pitch P is a function of a shape of the frame members 50-56; with the construction of FIG. 2, the skirt segment height $H_2$ serves as the pitch P, but in other embodiments can be defined by the PV support segment height $H_1$). As with the pitch P, the depth D of the receiving zone 90 is relatively small to promote high shipping densities. For example, in some embodiments, the depth D is not greater than 8 inches. Alternatively, the depth D is not greater than 5 inches; alternatively not greater than 4 inches. In yet other embodiments, the depth D is on the order of 3 inches.

With the above understanding in mind, and returning to FIG. 1A, in some embodiments of the present disclosure the stiffening device 26 includes a plurality of rods 100 combining to form one or more truss structures 102 (referenced generally) in at least the deployed state of FIG. 1A. Further, the rods 100 are sized and arranged for placement within the receiving zone 90 (FIG. 2), for example by a foldable arrangement.

In some embodiments, the plurality of rods 100 are segmented or coupled to one another as first and second rod sets 104, 106. In the deployed state of FIG. 1A, the rod sets 104, 106 are attached to one another, thereby enhancing an overall stiffness of the PV assembly 20 as described below. The rod sets 104, 106 can be identical, with the first rod set 104 being shown in greater detail in FIG. 4. The first rod set 104 includes two or more of the rods 100 that combine with one another or the perimeter frame 30 to define at least one of the truss structures 102. For example, the first rod set 104 includes first and second rods 108, 110. The first rod 108 has a base end 112 that is coupled to the first side frame member 50 in at least the deployed state of FIG. 4, and a leading end 114 opposite the base end 112. The second rod 110 is also defined by a base end 116 and a leading end 118, with the base end 116 coupled to the first side frame member 50 at a location spaced from the base end 112 of the first rod 108. The rods 108, 110 extend in a non-perpendicular fashion relative to a plane of the first side frame member 50, with the leading ends 114, 118 coupled to one another in forming an apex. As described below, the base ends 112, 116 can be pivotably connected to the first side frame member 50, or can be commonly attached to a coupling rod that is otherwise rotatably or pivotably coupled to the perimeter frame 30 (i.e., the coupling rod can rotate relative to the first side frame member 50). Regardless, a triangular truss structure is formed (labeled as 102*a* in FIG. 4).

A second truss structure 102*b* can additionally be provided, for example via third and fourth rods 120, 122. A base end 124 of the third rod 120 is coupled to the first side frame member 50 in at least the deployed state immediately proximate the base end 116 of the second rod 110, for example via a pivotable coupling. A leading end 126 of the third rod 120 is connected to a leading end 128 of the fourth rod 122, with a base end 130 of the fourth rod 122 similarly pivotably coupled to the first side frame member 50 in at least the deployed state. Additional truss structures 102 can further be formed by two or more additional rods. Further, a support rod 132 extends between and interconnects the apexes of the truss structures 102*a*, 102*b* (i.e., the support rod 132 is coupled to the first, second, third, and fourth rods 108, 110, 120, and 122 at the respective leading ends 114, 118, 126, and 128 thereof). Effectively, then, the support rod 132 combines with the second and third rods 110, 120 to define a third truss structure 102*c*. Relative to a length of the first rod set 104, the support rod 132 can consist of two or more separate rod segments, or can be a single, continuous rod. Further, the support rod 132 can be commonly linked to the second rod set 106 (FIG. 1A), or an additional support rod (or rods) provided.

Figure 4:
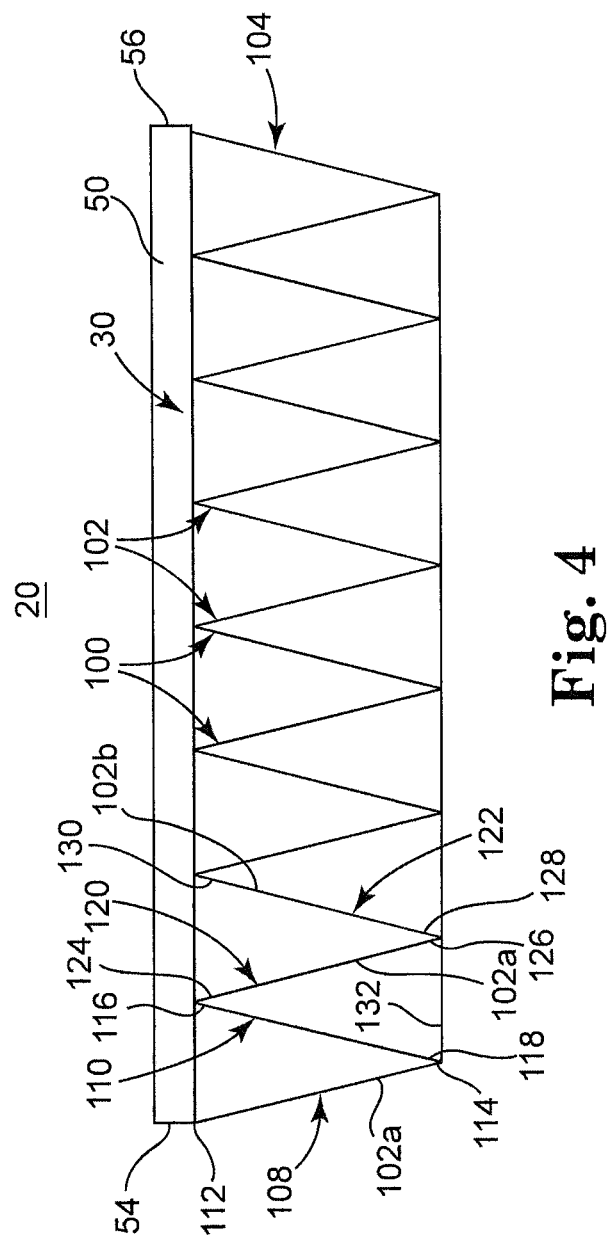
FIG. 4 is a simplified side view of the photovoltaic assembly of FIG. 1A.

The first rod set 104(*as* well as the second rod set 106) can assume a variety of forms differing from those reflected in FIG. 4. For example, the truss structures 102 can be reinforced with additional rods.

Regardless of an exact construction of the rod sets 104, 106, each of the individual rods 100 are sized to be entirely received within the receiving zone 90 (FIG. 2). For example, in some embodiments, none of the rods 90 have a length greater than the length L (FIG. 1B) of the perimeter frame 30 or a thickness/diameter greater than the depth D (FIG. 2) of the receiving zone 90. Thus, the rods 100 of the rod sets 104, 106 can be disassembled from one another and temporarily stored within the receiving zone 90 in the shipping state. In other embodiments, and as alluded to above, the rods 100 of the rod sets 104, 106 are more permanently assembled to one another, with the corresponding coupling to the perimeter frame 30 facilitating expedited transitioning of the rods 100 of the rod sets 104, 106, and thus of the stiffening device 26, between the deployed and shipping states as described below. With these constructions in which the rod sets 104, 106 are more permanently interconnected, each of the individual rods 100 associated with each rod set 104, 106 is sized and oriented for complete placement within the receiving zone 90. For example, several of the rods 100 can have a linear length that is greater than the width W (FIG. 1B) of the perimeter frame 30 (e.g., the first-fourth rods 108, 110, 120, and 122 can have a linear length greater than the width W). However, these so-dimensioned rods are spatially arranged to be non-parallel relative to a direction of the end frame members 54, 56 such that when the corresponding rod set 104, 106 is transitioned to the shipping state, the rods 100 readily nest within the receiving zone 90. Further, a length of the longitudinal support rod(s) 132 is less than the length L of the perimeter frame 30 such that the longitudinal support rod(s) 132 also fully nests within the receiving zone 90.

Figure 5A:
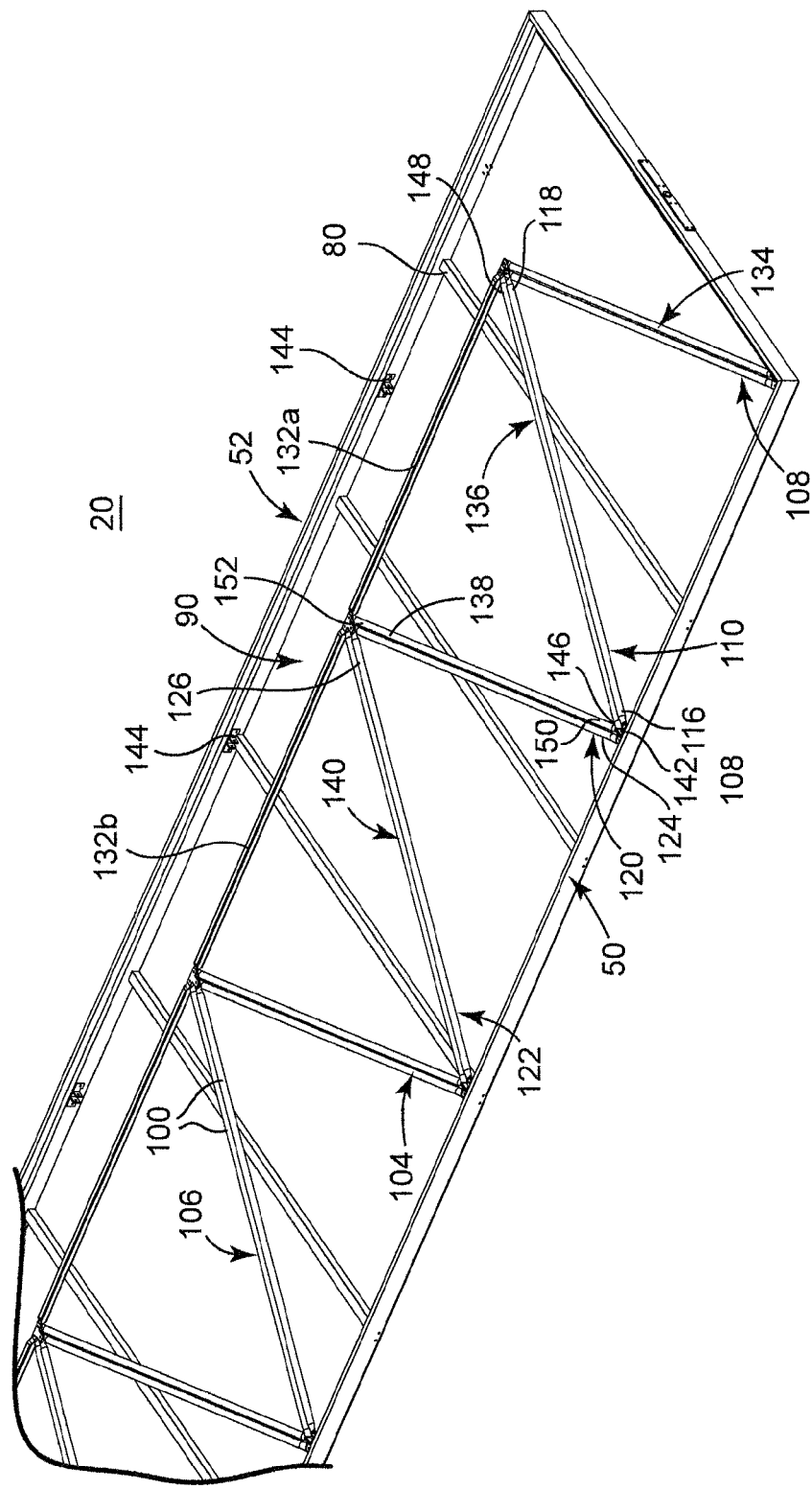
FIG. 5A is an enlarged perspective view of a portion of the photovoltaic assembly of FIG. 1B in the shipping state.

One folded arrangement of the stiffening device 26 in the shipping state is shown in greater detail in FIG. 5A. With this but one acceptable configuration, the first rod set 104 is pivotably coupled to the first side frame member 50, and is folded or pivoted into the receiving zone 90. The second rod set 106 is pivotably connected to the first rod set 104, and is uncoupled from the second side frame member 52. More particularly, the second rod set 106 is folded or pivoted within the receiving zone 90, and nested within the first rod set 104.

As a point of reference, the first-fourth rods 108, 110, 120, and 122 of the first rod set 104 are shown in FIG. 5A, as are first-fourth rods 134-140 of the second rod set 106. The first side frame member 50 forms or includes a plurality of coupling bodies 142 to which the rods 100 of the first rod set 104 are pivotably connected. For example, the base end 116 of the second rod 110 and the base end 124 of the third rod 120 are pivotably connected to the coupling body 142 visible in the view of FIG. 5A (e.g., connected to the coupling body 142 by a pin (not shown)). Similar pivoting connections are established between the base end of the remaining rods 100 of the first rod structure 104 relative to corresponding ones of the coupling bodies 142.

The second side frame member 52 similarly forms or includes coupling bodies 144 for pivotable connection to the base end of corresponding rods 100 of the second rod set 106. However, in the shipping state of FIG. 5A, the second rod set 106 is disconnected from the coupling bodies 144 of the second side frame member 52. Instead, the rods 100 of the second rod set 106 are folded "within" the first rod set 104. FIG. 5A illustrates a base end 146 and a leading end 148 of the second rod 136, and a base end 150 and a leading end 152 of the third rod 138 (of the second rod set 106). The leading ends 148, 152 are pivotably connected to the support rod 132, as are the leading ends of the rods 100 of the first rod set 104. Notably, FIG. 5A reflects that in some embodiments, the support rod 132 can be formed as or by a plurality of discrete segments (e.g., support rod segments 132a, 132b). Thus, for example, the leading ends 118, 148 of the second rods 110, 136 are pivotably connected to the first support rod segment 132a at a common connection point (as are the leading ends of the first rods 108, 134). Similarly, the leading ends 126, 152 of the third rods 120, 138 are pivotably connected to the first support rod segment 132a at a common connection point, as well as the second support rod segment 132b (as are the leading ends of the fourth rods 122, 140). In this regard, while the rods 100 of the second rod set 106 extend from the support rod 132 at angles commensurate with the angular extension of the corresponding rods 100 of the first rod set 104, the rods 100 of the second rod set 106 are slightly shorter than the corresponding rods 100 of the first rod set 104. This construction permits the second rod set 106 to readily nest within the first rod set 104 in the shipping state. Thus, in the folded or shipping state, the base ends 146, 150 of the second and third rods 136, 138 (of the second rod set 106) terminate adjacent, but slightly spaced from, the corresponding coupling body 142 provided with the first side frame member 50. Further, each of the rods 100 of the second rod set 106 nest against a corresponding rod 100 of the first rod set 104 (e.g., in the view of FIG. 5A, the first rod 134 of the second rod set 106 nests against the first rod 108 of the first rod set 104; the second rod 136 of the second rod set 106 nests against the second rod 110 of the first rod set 104; etc.). Thus, in the shipping state of FIG. 5A, all of the rods 100 are spatially aligned such that none of the rods 100 project beyond the receiving zone 90.

Figure 5B:
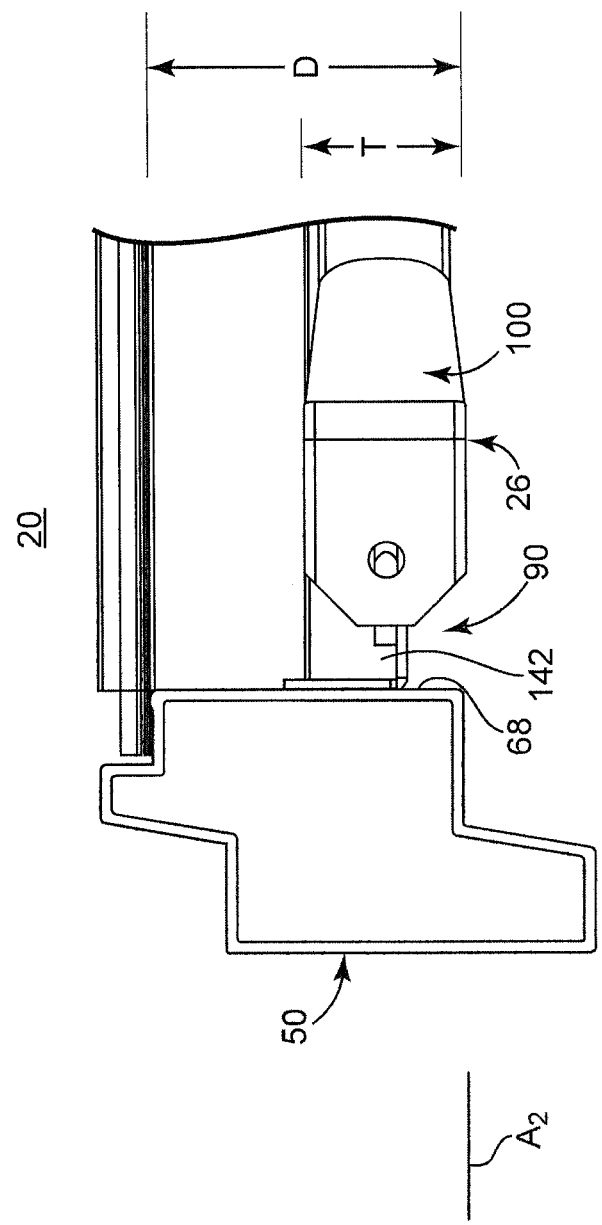
FIG. 5B is an enlarged, cross-sectional view of a portion of the photovoltaic assembly of FIG. 1A, including a portion of the stiffening device.

The compact nature of the stiffening device 26 in the shipping state is further reflected in FIG. 5B. More particularly, FIG. 5B illustrates the first side frame member 50 as including one of the coupling bodies 142 attached to or extending from the interior face 68. One of the rods 100 of the stiffening device 26 is also shown, and is provided as part of the first rod set 104 (FIG. 1A). The rod 100 is pivotably connected to the coupling body 142, and is pivoted or folded entirely within the receiving zone 90. With this one exemplary embodiment, the rod 100 is supported against the framework 24, for example, via the support rod 132 (FIG. 5A) bearing against a respective one of the cross beams 80 (as best shown in FIG. 5A). Each of the rods 100 can be formed of an identical or nearly identical thickness (or diameter) T with this thickness T being less than the depth D of the receiving zone 90. Thus, in the shipping state of FIG. 5B, an entirety of each and every one of the rods 100 is "within" the receiving zone 90, and does not project outwardly beyond the second PV support face plane $A_2$.

Figure 5C:
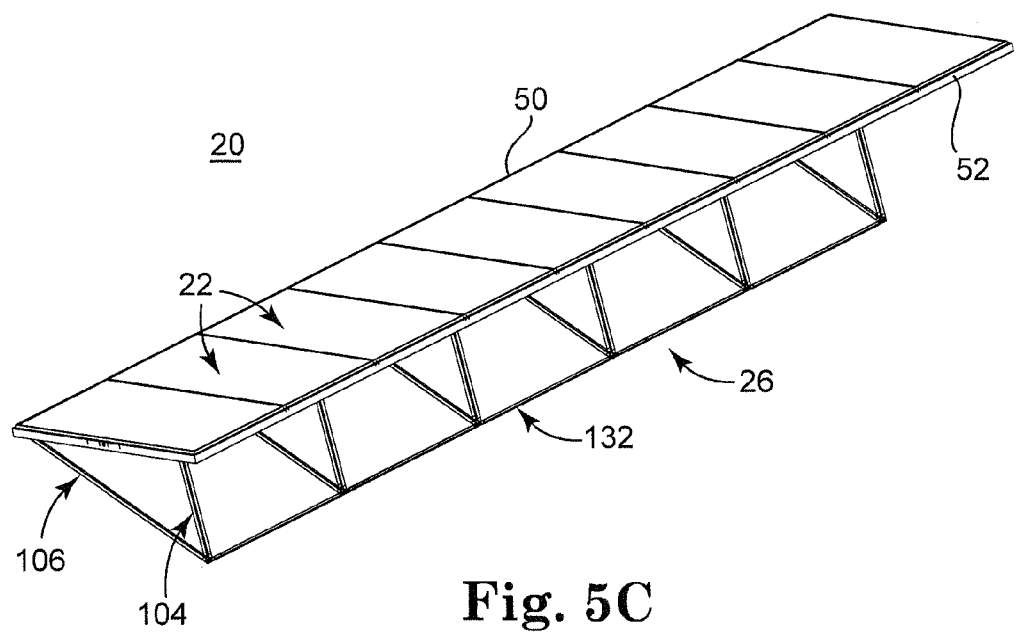
FIGS. 5C and 5D illustrate transitioning of the photovoltaic assembly of FIG. 1A to the deployed state.
Figure 5D:
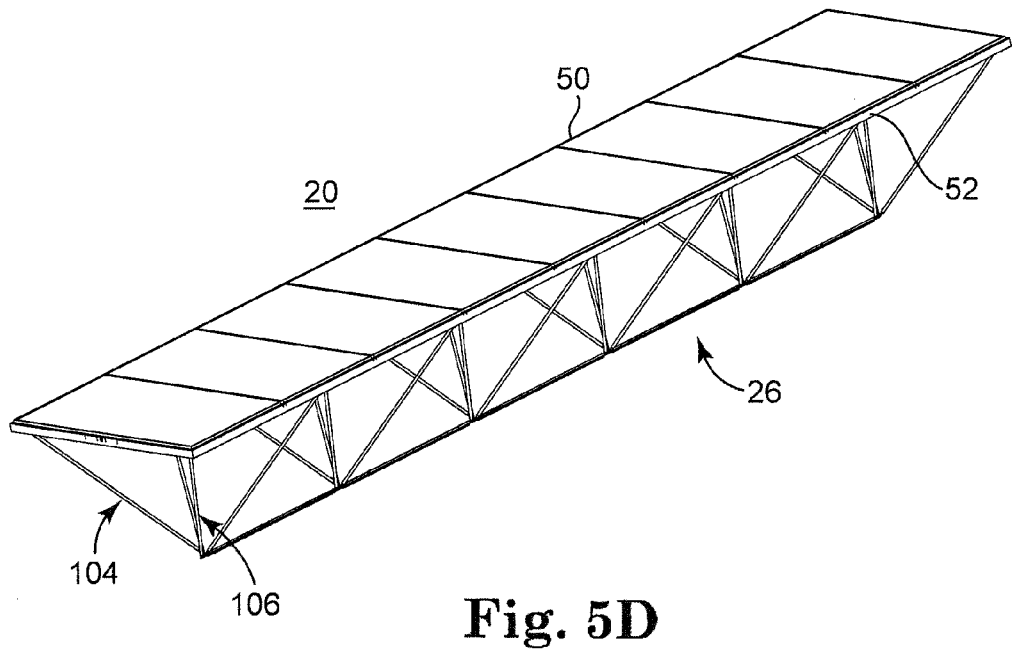

Transitioning of the stiffening device 26 from the shipping state to the deployed state is illustrated in FIGS. 5C and 5D. FIG. 5C reflects partial deployment whereby the support rod 132 is moved away from the PV laminate(s) 22 via pivoting of the first rod set 104 relative to the first side frame member 50. The base ends of the second rod set 106 are then pivoted away from the base ends of the first rod set 104 (pivoting at the support rod 132) and coupled to the second side frame member 52 (via the coupling bodies 144 (FIG. 5A)) as shown in FIG. 5D. Coupling of the second rod set 106 to the second side frame member 52 can be accomplished in a variety of fashions, for example by an installer employing pins to effectuate the desired connection.

The highly compact nature of the PV assembly 20 in the shipping state of the stiffening device 26 enables heretofore unavailable shipping densities from the manufacturer to an installation site. More particularly, and as shown in FIG. 6A, a relatively large number of the PV assemblies 20 can be placed in a stacked arrangement 160, and stored within a conventional cargo shipping container 162. With the stacked arrangement 160, individual ones of the PV assemblies 20 are stacked on top of one another (with the corresponding stiffening device 26 (FIG. 1A) in the shipping state), such that the perimeter frames 30 of adjacent PV assemblies 20 nest or bear against one another as described above with respect to FIG. 3. This stacked arrangement prevents damage to the PV laminate(s) 22, and permits convenient loading into the cargo shipping container 162, for example via a wheeled pallet (not shown). While the cargo shipping container 162 can assume various dimensions, conventional cargo shipping containers have internal dimensions on the order of 10-40 feet in exterior length, 5-9 feet in exterior width, and 5-9 feet in height. Larger-dimensioned cargo shipping containers are also commonly used. With a 40 foot long (external dimension) cargo shipping container, it has surprisingly been found that a sufficient number of the PV assemblies 20 according to the present disclosure can be loaded to provide a containerized shipping that exceeds conventional containerized shipping densities. As a point of reference, the shipping density is a function of the format and efficiency of the PV laminates 22 employed. With this in mind, the PV assemblies 20 of the present disclosure can provide a containerized shipping density of at least 60 kWp with PV laminates 22 employing thin film PV technology having an approximately 10% efficiency and a shipping density of at least 100 kWp with PV laminates employing high-efficiency silicon PV technology with an approximately 18% efficiency, for example with embodiments in which the perimeter frame 30 has the pitch P (FIG. 2) on the order of 3 inches. Other shipping densities, either greater or lesser, can also be achieved depending upon a size of the cargo shipping container 162 and a format and efficiency of the PV laminates 22.

In addition to promoting high shipping densities, the PV assemblies 20 of the present disclosure are readily unloaded and installed. For example, and with reference to FIG. 6B, following shipment and delivery of the loaded cargo shipping container 162 to the installation site, individual ones of the PV assemblies 20 are readily removed from the stacked arrangement 160. The stacked arrangement 160 can be described as having an uppermost PV assembly 20a (reflected in FIG. 6B as being partially removed from the stacked arrangement 160). Once lifted from the stacked arrangement 160, the uppermost PV assembly 20a is transitioned to the deployed state as described and shown in FIG. 6C.

Apart from the second rod set 106 coupling procedure and related components (e.g., pins), no other assembly or operator interface is required to immediately complete transitioning of the stiffening device 26 to the deployed state in some embodiments. In other embodiments, one or more of the rods 100 are uncoupled from the framework 24 and each other in the shipping state, and are thus manually assembled to the framework 24/deployed state. The resultant, multitude of truss structures 102 robustly supports or stiffens the PV assembly 20 to an extent necessary for satisfying expected environmental conditions at the installation site. That is to say, the deployed stiffening device 26 reinforces the structural integrity of the PV assembly 20, and in particular the perimeter frame 30, such that even with perimeter frame lengths of greater than 15 feet, the PV assembly 20 will not fail in the presence of, or otherwise be damaged by, wind gusts of up to 90 miles per hour.

Figure 7A:
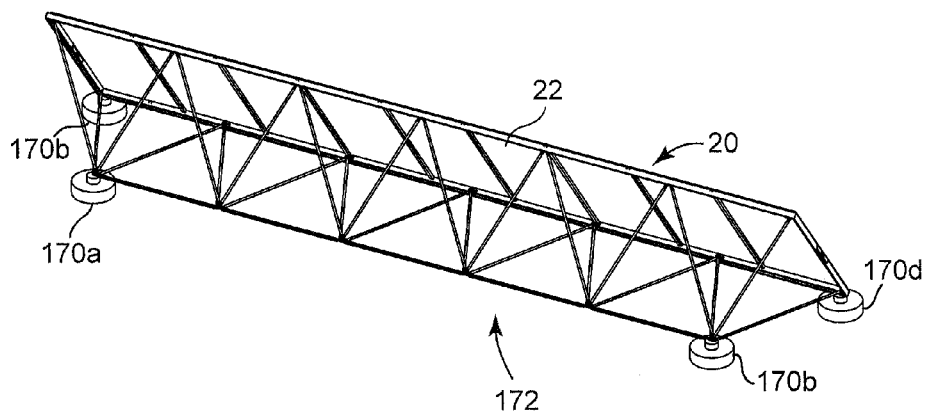
FIG. 7A is a rear perspective view of the photovoltaic assembly of FIG. 1A mounted to ground in a fixed arrangement.

Once in the deployed state, the PV assembly 20 is immediately available for final mounting at an installation site with support structures and optionally a tracking system. One possible fixed installation of the PV assembly 20 is shown in FIG. 7A. One or more ground mount support structures 170 (e.g., cement footings) affix the PV assembly 20 relative to ground 172, with the stiffening device 26 in the deployed state serving as a base for the mounting. For example, rearward support structures 170a, 170b are mounted to the stiffening device 26, whereas the perimeter frame 30 is mounted to forward support structures 170c, 170d, resulting in a tilted orientation of the PV laminate(s) 22. Though not shown, a series of similarly configured and mounted PV assemblies 20 can be mounted side-by-side, with the corresponding PV laminates 22 electrically linked as part of a large scale solar energy collection site.

Figure 7B:
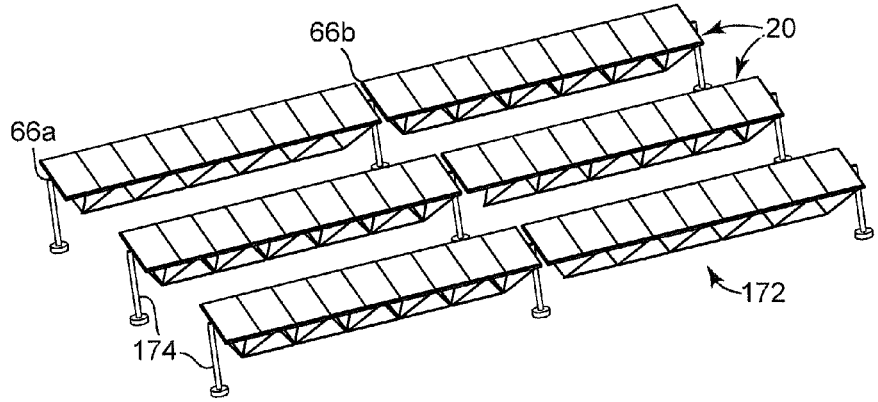
FIG. 7B is a perspective view of a plurality of the photovoltaic assemblies of FIG. 1A mounted to ground in a horizontal tracking arrangement.

The PV assembly 20 is equally useful with tracking-type installations. As a point of reference, tracker drive systems can assume a variety of forms, and generally operate to rotate or rock rows of PV panels to keep the panels as square to the sun as possible. Typically, the rows are arranged with their axes disposed in a north-south direction, and the tracker drive system gradually rotates the rows of panels throughout the day from an east-facing direction in the morning to a west-facing direction in the afternoon. The rows of panels are brought back to the east-facing orientation for the next day. Single axis or dual axis tracker drive systems are known, some useful examples of which are described in U.S. Pat. No. 6,058,930, the teachings of which are incorporated herein by reference. With this general understanding of tracker drive systems in mind, FIG. 7B illustrates an alternative mounting arrangement of a plurality of the PV assemblies 20 in accordance with the present disclosure. As shown, the PV assemblies 20 are mounted to the ground 172 in rows via ground mount support structures 174 (e.g., vertical shafts extending from cement footings) supporting the PV assemblies 20 at the corresponding shafts 82a, 82b (referenced generally, and better shown in FIG. 1A). Though not shown, the installation of FIG. 7B can further include a tracker drive system that operates to rotate the PV assemblies 20 as described above.

Figure 7C:
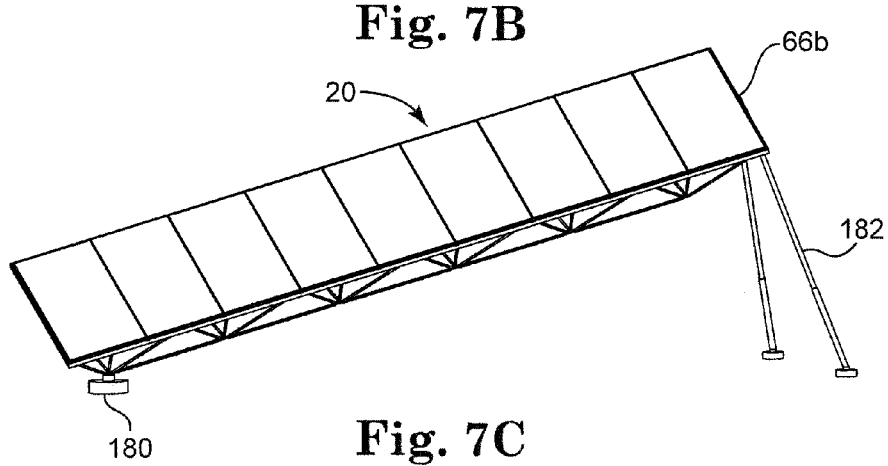
FIG. 7C is a perspective view of the photovoltaic assembly of FIG. 1A mounted to ground in a tilted tracking arrangement.
Figure 7D:
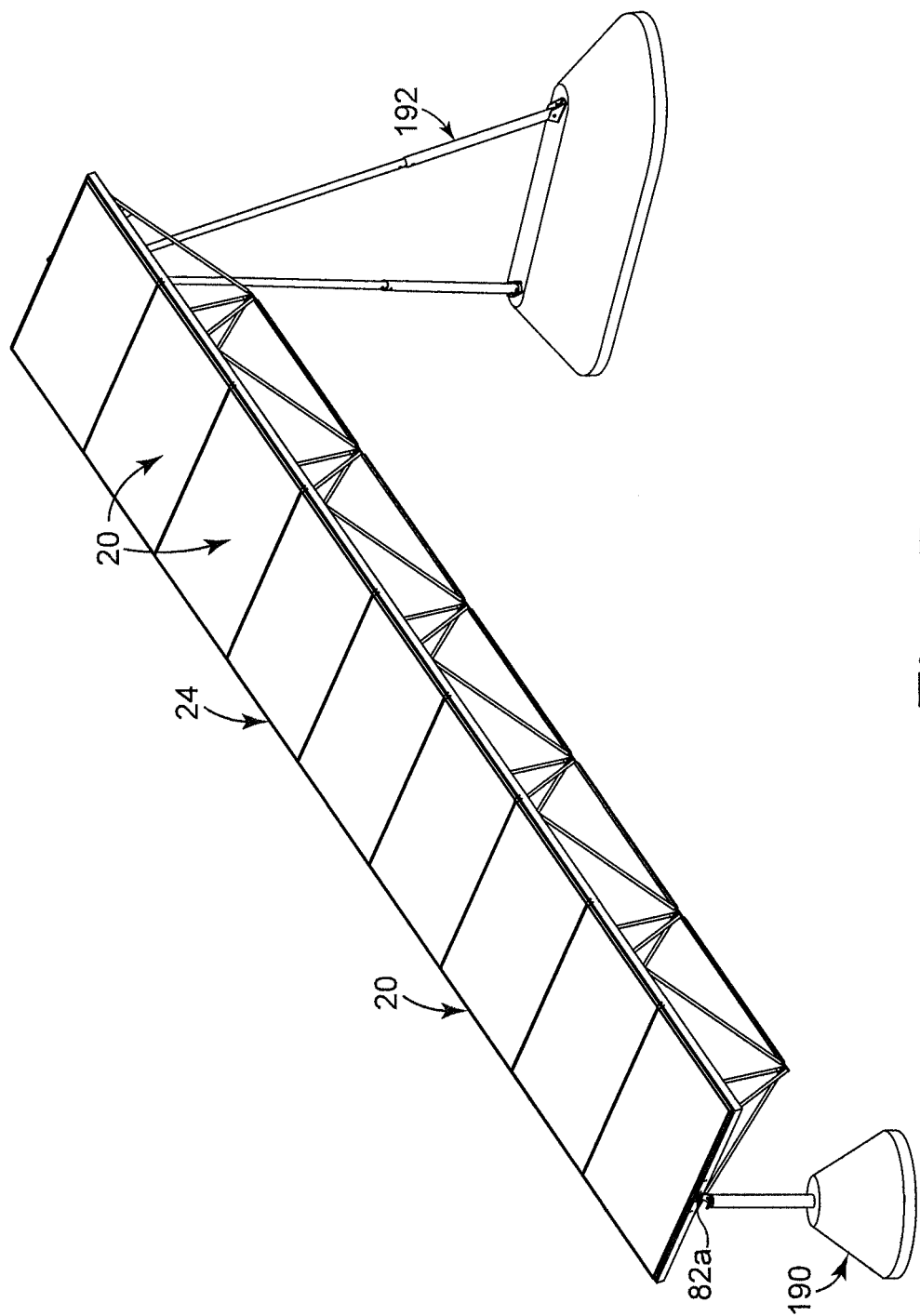
FIG. 7D is a perspective view of the photovoltaic assembly of FIG. 1A mounted to ground in another tilted tracking arrangement.

Yet another installation arrangement made available by the PV assembly 20 of the present disclosure is reflected in FIG. 7C. A first ground mount support structure 180 (e.g., cement footing) mounts an end of to the stiffening device 26 to the ground 172, whereas a second ground mount support structure 182 (e.g., metal bars extending from cement footings) supports an opposite end of the framework 24. For example, the second ground mount support structure 182 is mounted to the second shaft 82b provided with the framework 24. With this arrangement, the PV laminate(s) 22 has a tilted orientation relative to the ground 172 (as well as the sky), and can be tracked or driven about a tracking axis defined between the points of attachment of the ground mount support structures 180, 182 by a tracker drive system (not shown). Another related installation arrangement is shown in FIG. 7D. First and second ground mount structures 190, 192 support opposing ends of the framework 24 (e.g., connected to respective ones of the shafts 82a, 82b (one of which is visible in FIG. 7D). A height of the second ground mount structure 192 is greater than the first ground mount structure 190, resulting in the tilted orientation shown. With this mounting approach, a tracking axis of the PV assembly 20 is through or parallel with a plane of the PV laminate(s) 22. A wide variety of other installation arrangements are also available.

In addition to promoting efficient shipping from a manufacturer and assembly/installation by an installer, the PV assembly 20 of the present disclosure readily promotes use thereof at a second installation site. For example, after a period of time (e.g., years), the initial installer of the PV assembly 20 may desire to move the PV assembly 20 to a different installation site (e.g., as part of a sale of the PV assembly 20). Under these circumstances, the PV assembly 20 is simply removed from the ground mount support structure(s), and the stiffening device 26 transitioned to the shipping state. The so-arranged PV assembly 20 can then be conveniently shipped to the second installations site as described above, for example, by stacking a number of the PV assemblies 20 for placement in a cargo shipping container.

Figure 8A:
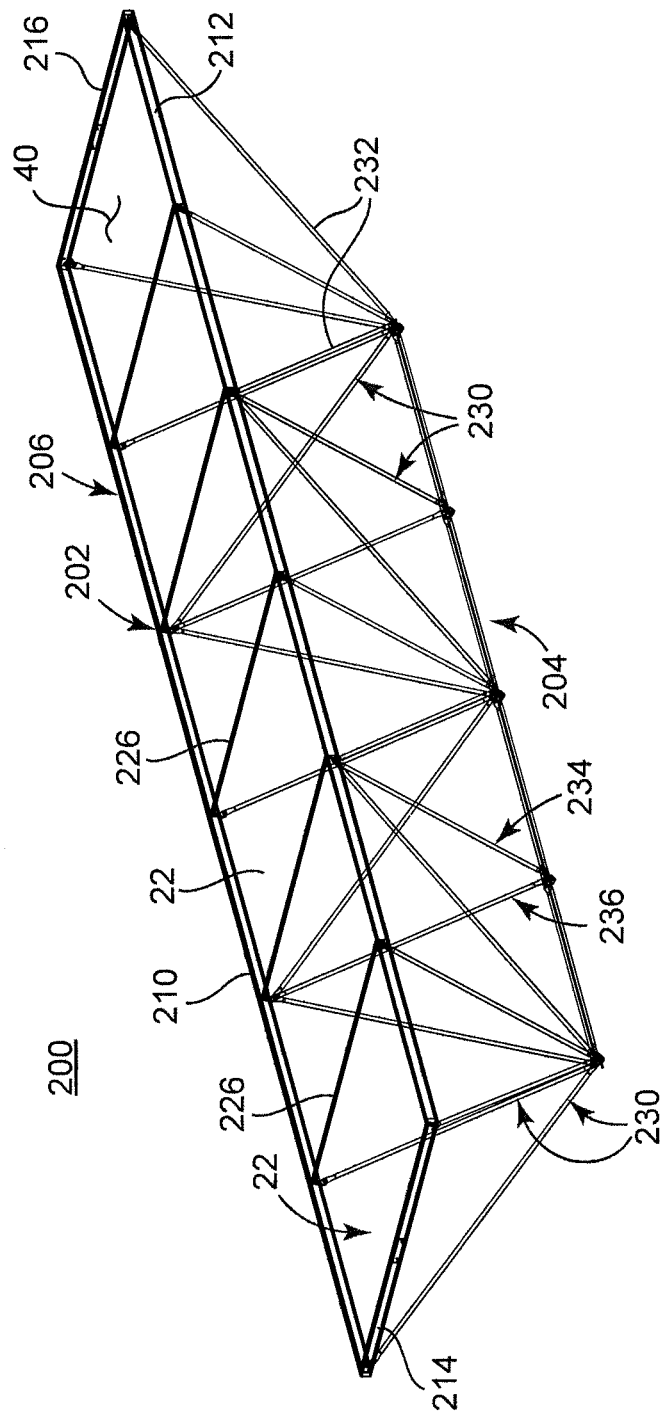
FIG. 8A is a top perspective view of another photovoltaic assembly in accordance with principles of the present disclosure including a stiffening device in a deployed state.
Figure 8B:
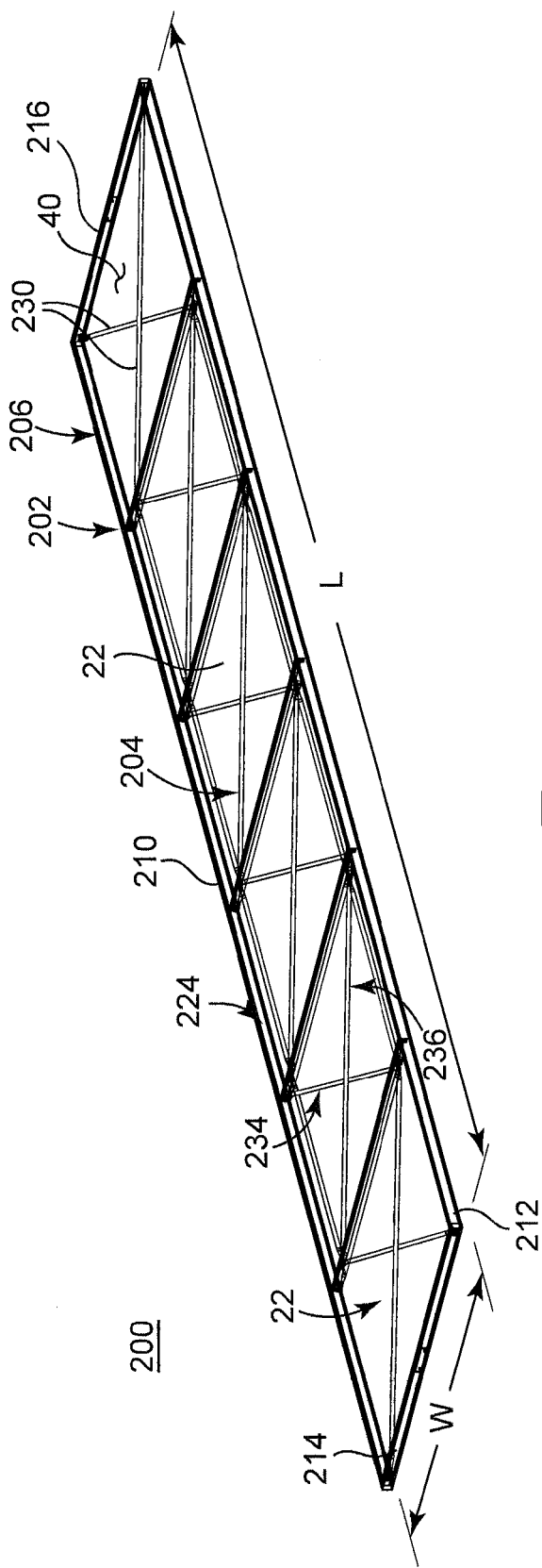
FIG. 8B is a bottom perspective view of the photovoltaic assembly of FIG. 8A, with the stiffening device in a shipping state.

Another embodiment of a PV assembly 200 in accordance with the present disclosure is shown in FIGS. 8A and 8B. The PV assembly 200 is akin to the PV assembly 20 (FIG. 1A) described above, and includes the PV laminate(s) 22, framework 202, and a stiffening device 204. As with the PV assembly 20, the PV laminates 22 are assembled to, and encased by, a perimeter frame 206 of the framework 202. The stiffening device 204 is associated with the framework 202, and is coupled to the perimeter frame 206 in at least the deployed state of FIG. 8A. Further, the stiffening device 204 is transitionable to the shipping state of FIG. 8B in which an entirety of the stiffening device 26 is disposed within the confines of a pitch of the perimeter frame 206. In the deployed state, the stiffening device 204 enhances a stiffness or rigidity of the PV assembly 200 in a plane of the perimeter frame 206 to levels sufficient for long-term structural integrity in the presence of repeated wind gusts.

The perimeter frame 206 forms the PV assembly 200 to have a rectangular shape in some constructions, and includes opposing, first and second side frame members 210, 212, and opposing, first and second end frame members 214, 216. Once again, the side frame members 210, 212 define an overall length L on the order of at least 10 feet, whereas the end frame members 214, 216 define the width W of the PV assembly 200 as being at least 5 feet.

Figure 9:
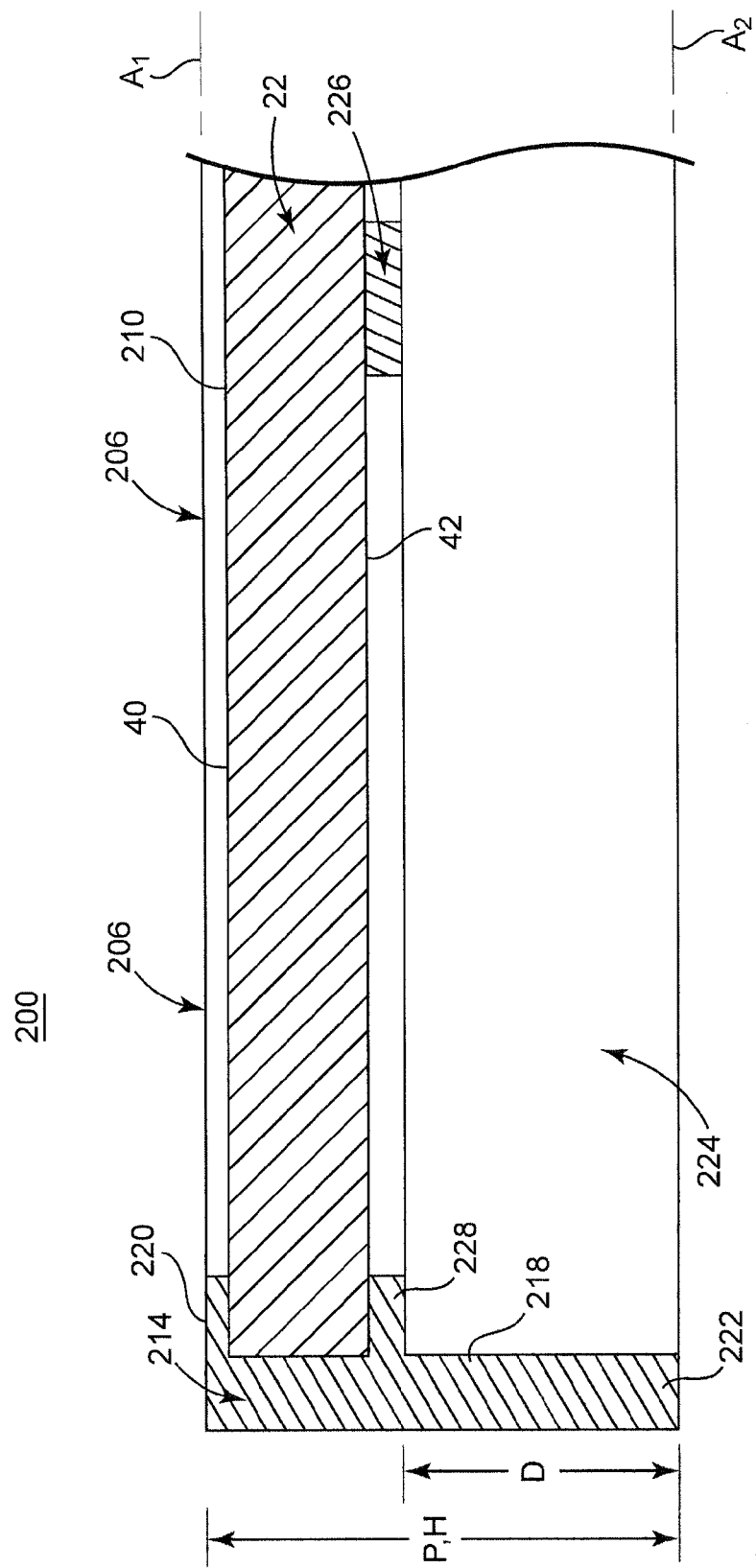
FIG. 9 is an enlarged, cross-sectional view of a portion of the photovoltaic assembly of FIG. 8A, with the stiffening device removed.

The frame members 210-216 have, in some constructions, an identical cross-sectional shape shown, for example, in FIG. 9. The frame members 210-216 can be tubular in nature, and form a PV support section 218. In contrast to the frame members 50-56 (FIG. 2) described above, the frame members 210-216 do not include the optional skirt section 62 (FIG. 2). With the construction of FIG. 9, then, the frame member 214 defines or forms opposing, first and second PV support faces 220, 222, each of which define corresponding PV support face planes $A_1$, $A_2$. Relative to a stacked arrangement during shipping, the PV support faces 220, 222 also serve as the load bearing surfaces of the perimeter frame 206, such that a height H of the PV support section 218 (and thus of the perimeter frame 206) is also the pitch P of the perimeter frame

206, defined as the distance or dimension between the PV support faces 220, 222 (and thus between the PV support face planes $A_1$ and $A_2$). The pitch P establishes a stacking depth for the PV assembly 200 during shipping, and is not greater than 8 inches with some configurations. Alternatively, the pitch P is not greater than 5 inches; alternatively not greater than 4 inches. In yet other embodiments, the pitch P is on the order 3 inches.

FIG. 9 further illustrates mounting of the PV laminate 22 to the frame member 210. The PV laminate(s) 22 is assembled to the perimeter frame 206 such that the PV front surface 40 is at or immediately proximate the first PV support face 220 (and thus the first PV support face plane $A_1$). The PV rear surface 42 is opposite the first PV support face 220, but is spaced from the second PV support face 222 (and thus the second PV support face plane $A_2$). As a result, the perimeter frame 206 and the PV laminate(s) 22 combine to define a receiving zone 224 that is laterally bounded by the perimeter frame members 210-216 and spatially terminates in the second PV support face plane $A_2$. The receiving zone 224 can be described as extending to the PV rear surface 42. Alternatively, the receiving zone 224 can be defined apart from the PV rear surface 42, for example via cross beams 226 (one of which is shown in FIG. 9) provided with the framework 202 and positioned commensurate with a mounting ledge 228 formed with or by the perimeter frame members 210-216 (e.g., FIG. 9 reflects the first end frame member 214 as including the mounting ledge 228). Regardless, the receiving zone 224 provides an open volume including a depth D within which the stiffening device 204 (FIG. 8A) is fully stored in the shipping state of the PV assembly 200. The depth D is less than the pitch P, and is not greater than 8 inches; alternatively not greater than 5 inches; alternatively not greater than 4 inches. In yet other embodiments, the depth D is on the order of 3 inches.

Returning to FIG. 8A, the stiffening device 204 includes a plurality of rods 230 combining to form one or more truss structures 232 (referenced generally) in at least the deployed state. The rods 230 are sized and arranged for placement within the receiving zone 224 (FIG. 9), for example via a foldable arrangement.

The plurality of rods 230 can be segmented or coupled to one another as first and second rods sets 234, 236. In the deployed state of FIG. 8A, the rod sets 234, 236 are attached to one another, thereby enhancing an overall stiffness of the PV assembly 200 as described below. The rod sets 234, 236 can be identical with the first rod set 234 being shown in greater detail in FIG. 10 (as a point of reference, the second rod set 236 is substantially transitioned or folded into the receiving zone 224 in FIG. 10). The first rod set 234 includes two or more of the rods 230 that combine with one another and/or the perimeter frame 206 to define at least one of the truss structures 232. For example, the first rod set 234 includes first and second rods 238, 240. The first rod 238 has a base end 242 that is coupled to the first side frame member 210 in at least the deployed state of FIG. 10, and a leading end 244 opposite the base end 242. The second rod 240 is also defined by a base end 246 and a leading end 248, with the base end 246 coupled to the first side frame member 210 at a location spaced from the base end 242 of the first rod 238. The rods 238, 240 extend a non-perpendicular fashion relative to a plane of the first side frame member 210, with the leading ends 244, 248 coupled to one another and forming an apex. The base ends 242, 246 are pivotably attached to the first side frame member 210 via a common coupling rod 250 that is otherwise rotatably or pivotably coupled to the perimeter frame 206 (i.e., the coupling rod 250 can rotate relative to the first side frame member 210). Alternatively, the base ends 242, 246 can be directly attached to the first side frame member 210. Regardless, a triangular truss structure is formed (labeled as 232a in FIG. 10). Additional truss structures 232 are further formed by the rods 230 of the first rod set 234, with various leading ends (and corresponding truss structure apexes) thereof being interconnected by a common support rod 252 (or support rod segments). For example, truss structures 232b and 232c are identified in FIG. 10. As compared to the stiffening device 26 (FIG. 1A) previously described, the rod sets 234, 236 of FIG. 10 further include optional reinforcement rods 253. With some constructions, a spatial location of the reinforcement rods 253 corresponds with a location of the optional cross beams 226.

Figure 10:
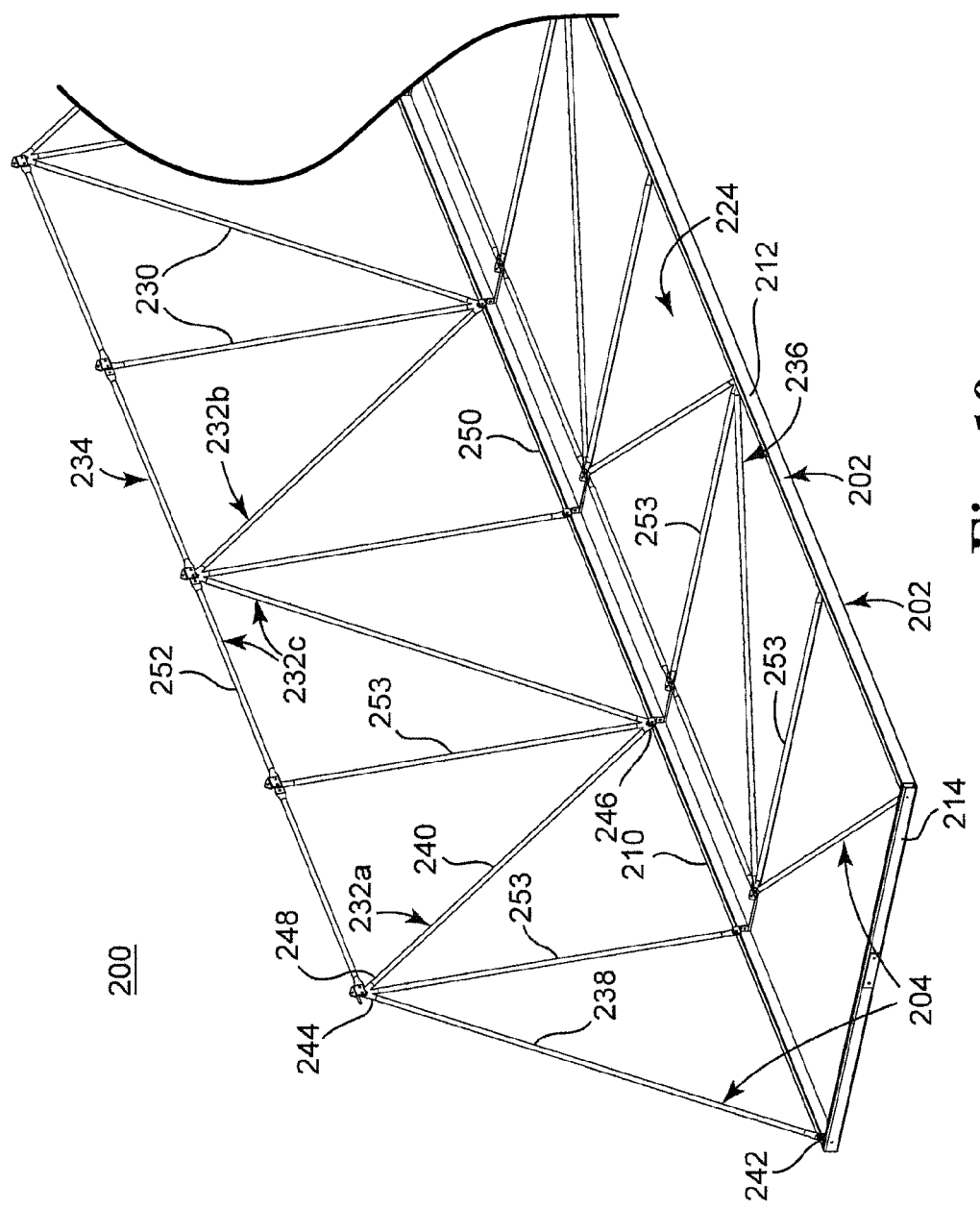
FIG. 10 is a bottom perspective view of a portion of the photovoltaic assembly of FIGS. 8A and 8B, with the stiffening device partially deployed.

The first rod set 234 (as well as the second rod set 236) can assume a variety forms differing from those reflected in FIG. 10. Regardless, each of the individual rods 230 are sized to be entirely received within the receiving zone 224 (referenced generally). For example, in the arrangement of FIG. 10, the second rod set 236 has been transitioned approximately to the shipping state with the corresponding rods 230 entirely received or disposed within the receiving zone 224.

Figure 11:
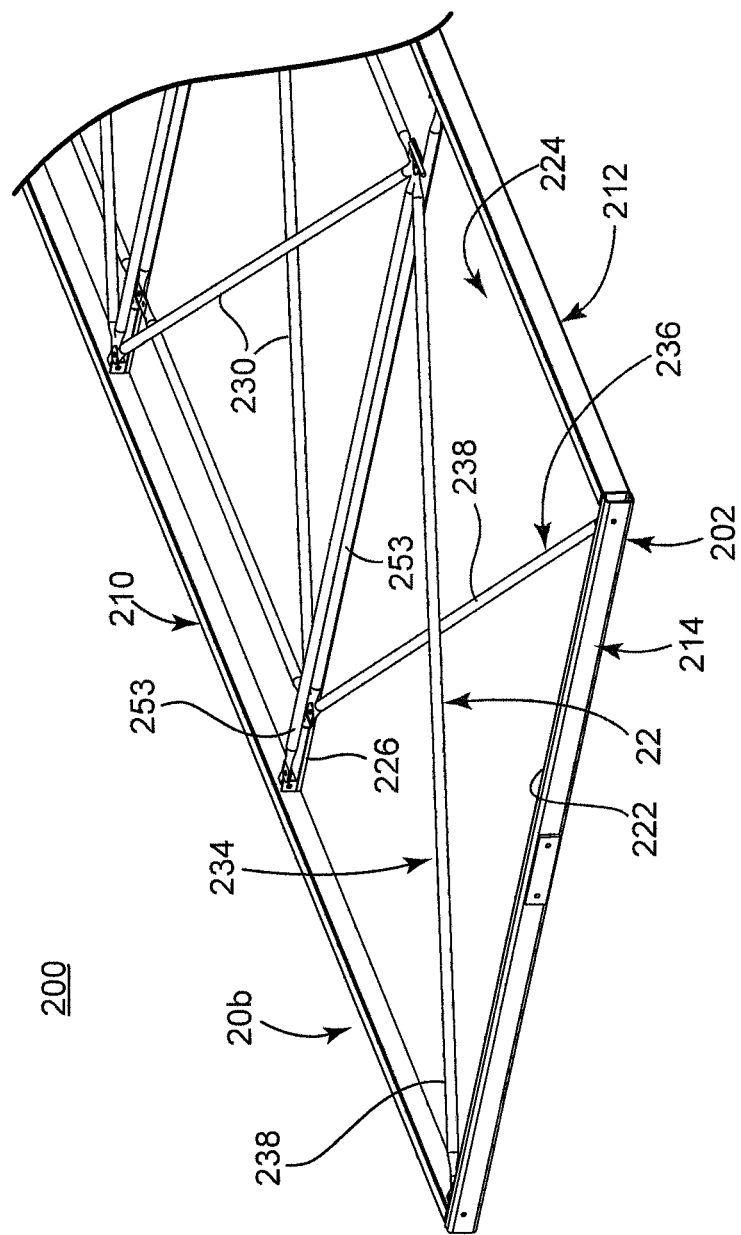
FIG. 11 is an enlarged, rear perspective view of the photovoltaic assembly of FIG. 8B in the shipping state.

Final transitioning of the stiffening device 204 to the shipping state is shown in FIG. 8B. The second rod set 236 is first folded or pivoted into the receiving zone 224, followed by the first rod set 236 being folded or pivoted onto the second rod set 236. The abutting relationship is shown in greater detail in FIG. 11. With this one exemplary embodiment, the second rod set 236 is supported against the framework 202, for example via reinforcement rods 254 of the second rod set 236 laying on respective ones of the cross beams 226. The first rod set 234 bears against the second rod set 236, for example with the reinforcement rods 254 of the first rod set 234 laying on or against the corresponding reinforcement rods 254 of the second rod set 236. With embodiments in which the rods 230 are formed of an identical or nearly identical diameter, additional ones of the rods of the first rod set 234 can bear against rods of the second rod set 236. For example, the first rod 238 of the first rod set 234 contacts the first rod 238 of the second rod set 236. With this arrangement, a combined thickness of two of the rods 230 is less than the depth D (FIG. 10) of the receiving zone 224. That is to say, while the first rod 238 of the first rod set 234 is "above" the first rod 238 of the second rod set 236 (relative to the orientation of the FIG. 11), an entirety of the first rod set 234 is "within" the receiving zone 224. Thus, in the shipping state of FIG. 11, the second PV support face 62 (and thus the second PV support face plane $A_2$ (FIG. 10)) of the perimeter frame 206 defines the uppermost surface (relative to the orientation of FIG. 11) of the PV assembly 200.

As with the PV assembly 20 (FIG. 1A), the highly compact nature of the PV assembly 200 in the shipping state of the stiffening device 204 enables heretofore unavailable shipping densities from the manufacturer to an installation site. More particularly, and as shown in FIG. 12A, a relatively large number of the PV assemblies 200 can be placed in a stacked arrangement 260, and stored within the conventional cargo shipping container 162 described above. Following shipment and delivery of the loaded cargo shipping container 162 to an installation site, individual ones of the PV assemblies 200 are readily removed from the stacked arrangement 260 as shown in FIG. 12B. The stacked arrangement 260 can be described as having an uppermost PV assembly 200a (reflected in FIG. 12B as being partially removed from the stacked arrangement 260). Prior to removal from the stacked arrangement 260, the stiffening device 204 of the uppermost PV assembly 200a is transitioned to the deployed state, and provides a convenient surface for lifting of the uppermost PV assembly 200a by an appropriate device (e.g., crane). For example, where the PV assemblies 200 incorporate the pivotable rod sets 234, 236 as the stiffening device 204, the rod sets 234, 236 are unfolded or transitioned to the deployed state, and the corresponding longitudinal support rods 252 employed to lift the uppermost PV assembly 200a from the stacked arrangement 260. Remaining ones of the PV assemblies 200 of the stacked arrangement 260 are sequentially removed in a similar fashion.

Figure 13:
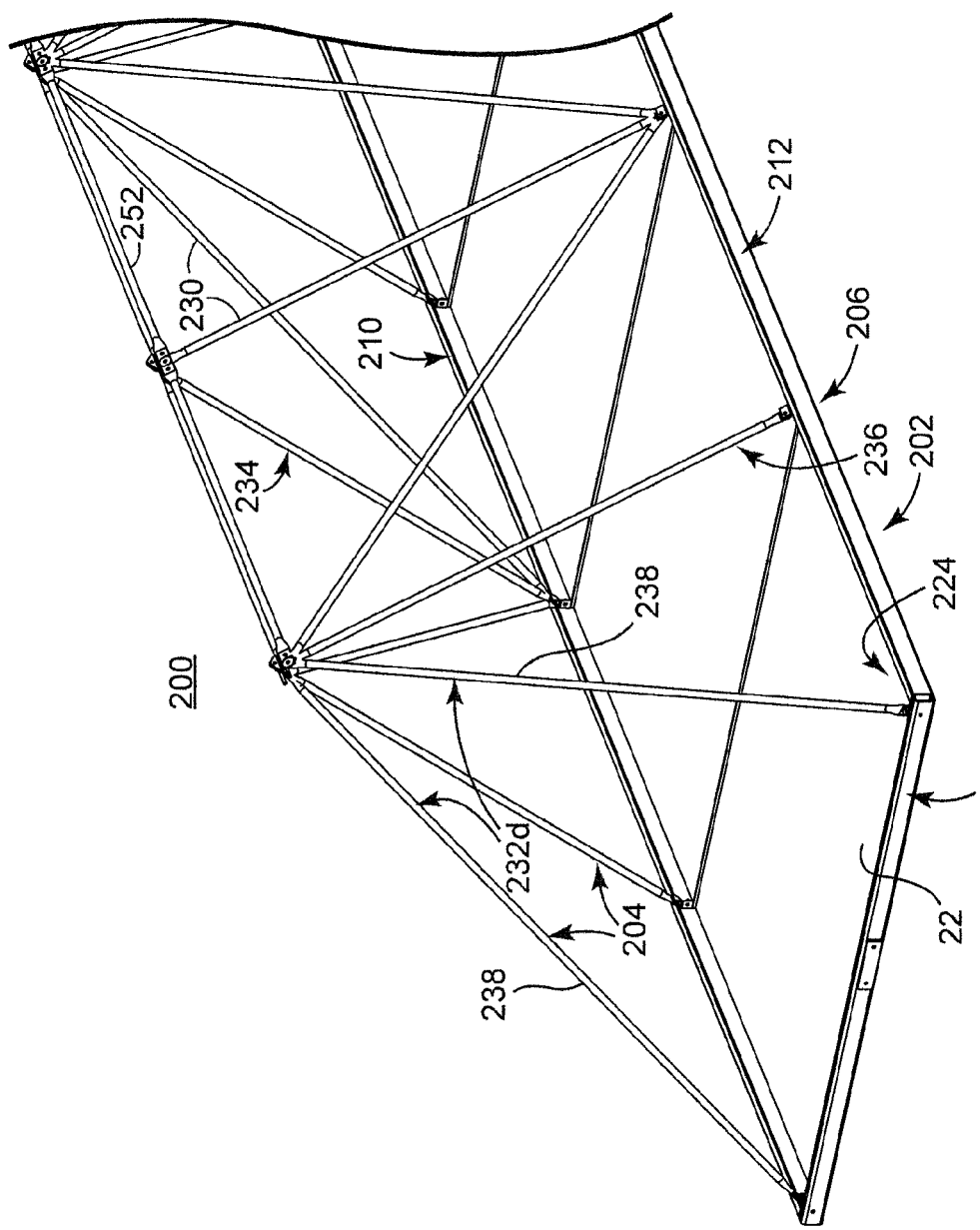
FIG. 13 is an enlarged, bottom perspective view of a portion of the photovoltaic assembly of FIG. 8A, further depicting the deployed state.

Assembly of the stiffening device 204 to the deployed state is further reflected in FIG. 13. The rod sets 234, 236 are unfolded from the receiving zone 224 to the deployed state, and the corresponding longitudinal support rods 252 are mechanically coupled or otherwise attached to one another. For example, a pinning structure (not shown) can be provided that couples the support rods 252; the support rods 252 can be configured to self-couple (e.g., via a biased ball and socket arrangement); the support rods 252 can be welded to one another; etc. Once so-constructed, the rod sets 234, 236 are coupled to one another, resulting in additional, spatial truss structures 232 (e.g., the first rod 238 of the first rod set 234 and the first rod 238 of the second rod set 236 combine to define a truss structure 232d).

Once in the deployed state, the PV assembly 200 is immediately available for mounting at an installation site with support structures and optionally a tracking system as previously described.

Figure 14:
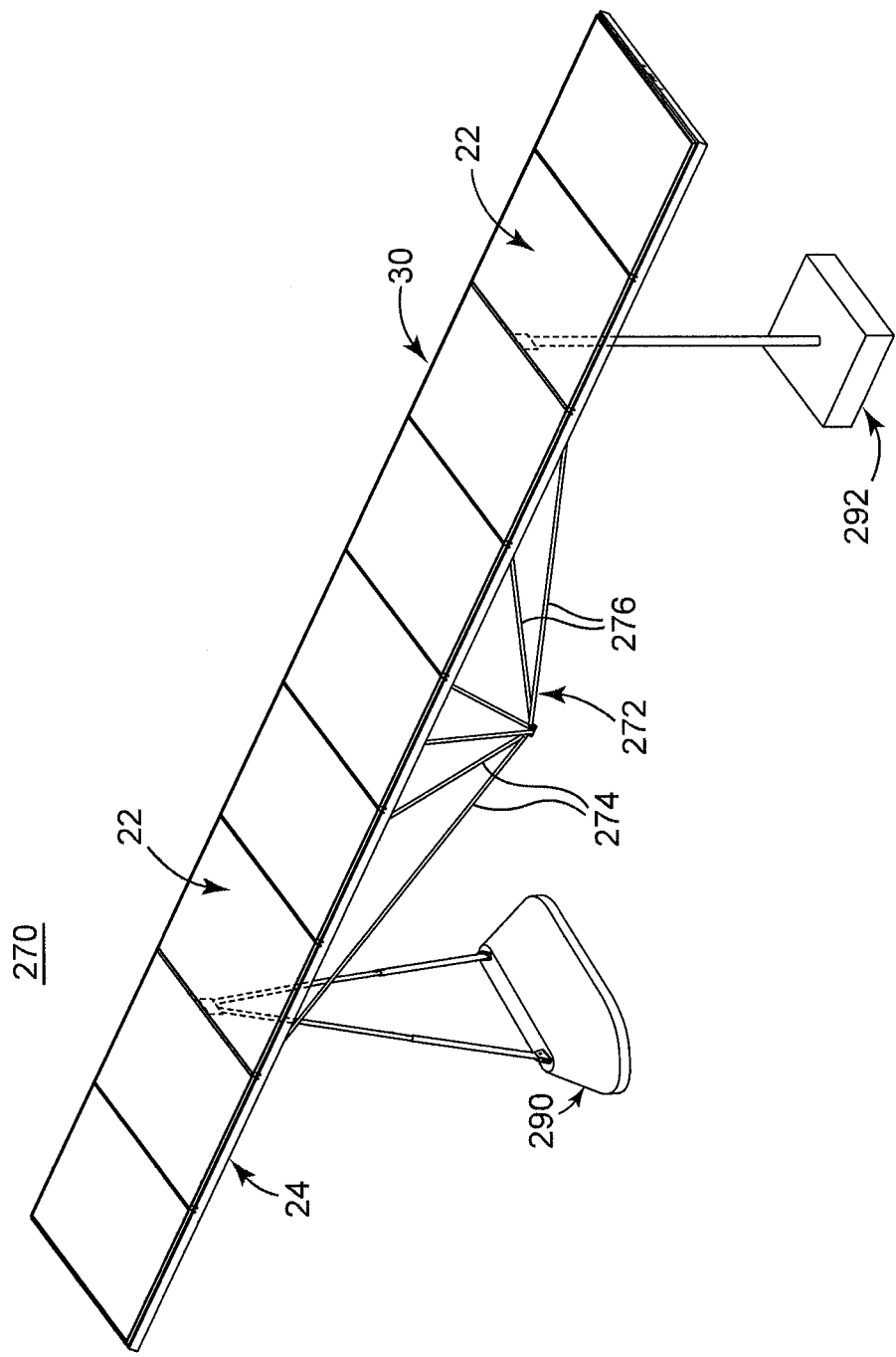
FIG. 14 is a perspective view of another photovoltaic assembly in accordance with the present disclosure and mounted to ground.

Yet another, related embodiment PV assembly 270 is shown in a deployed state and upon final installation in FIG. 14. The PV assembly 270 includes the PV laminates 22 and the framework 24 as previously described, along with a stiffening device 272. The framework 24 can assume any of the forms previously described, and includes the perimeter frame 30 maintaining the PV laminates 22 as well as the stiffening device 272. The stiffening device 272 is also akin to the stiffening devices previously described, and includes a plurality of rods 274 combining to form several truss structures 276 (referenced generally). With the construction of FIG. 14, however, the stiffening device 272 extends along only a portion of a length of the perimeter frame 30. For example, the stiffening device 272 can be centered relative to a length of the perimeter frame 30.

The stiffening device 272 is transitionable between the deployed state of FIG. 14 and a shipping state (not shown) in any of the manners previously described. Upon final installation, ground mount structures 290, 292 are directly attached to the framework 24 at locations longitudinally spaced from the stiffening device 272. Thus, with the PV assembly 270 of FIG. 14, the stiffening device 272 provides inboard support, with the ground mount structures 290, 292 supporting outboard portions of the PV assembly 270. Though not shown, a separate torque arm can be provided with the framework 24 and/or the ground mount structures 290, 292 that serves to facilitate tracking.

Figure 15:
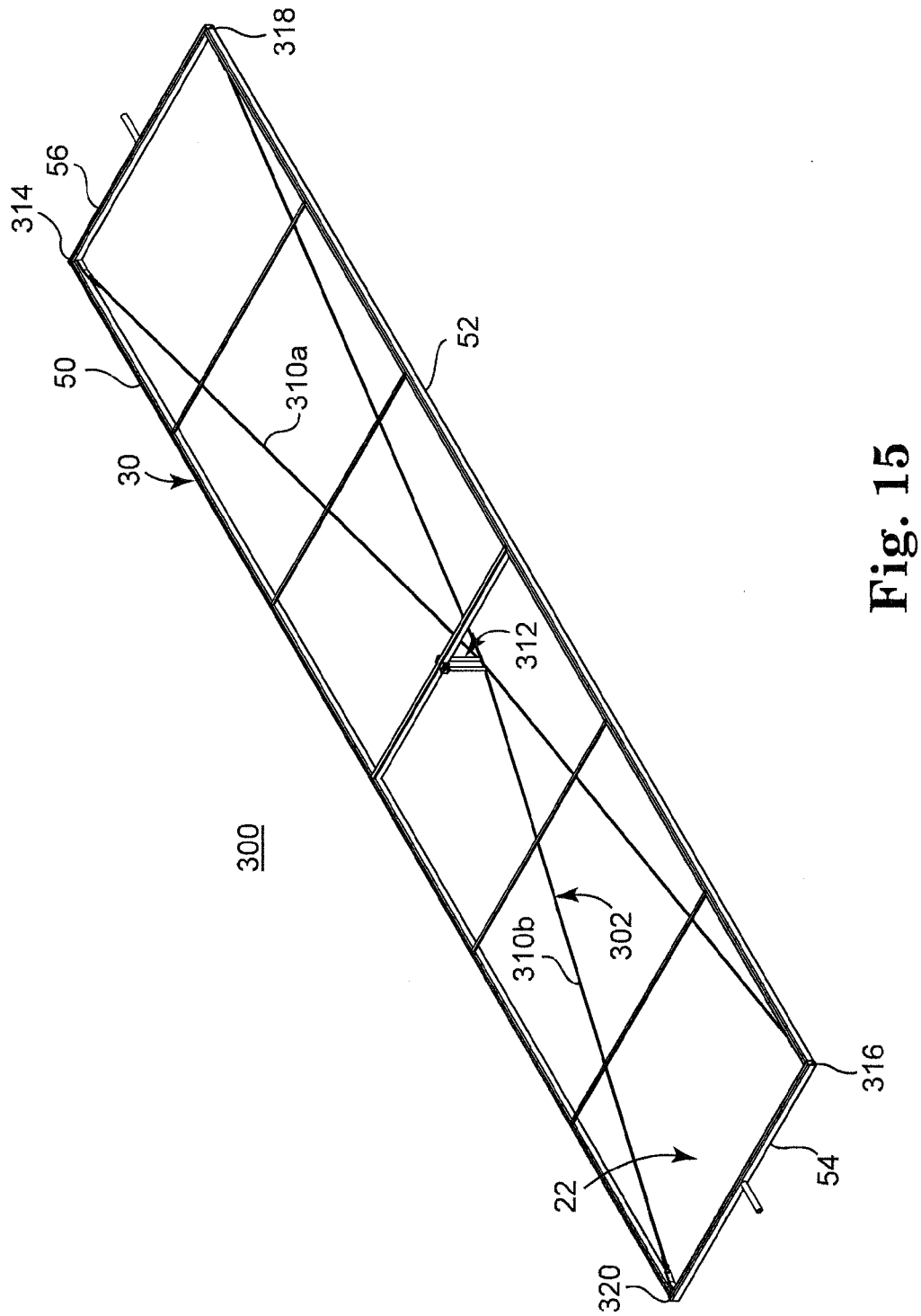
FIG. 15 is a top perspective view of another photovoltaic assembly in accordance with principles of the present disclosure, including a stiffening device in a deployed state.

While the stiffening device 26, 204, 272 has been described as employing the truss structure-forming rods, other constructions having a compact shipping state and a reinforcing deployed state are also contemplated. For example, FIG. 15 illustrates another PV assembly 300 in accordance with aspects of the present disclosure. The PV assembly 300 is akin to the PV assembly 20 (FIG. 1A) described above, and includes the PV laminate(s) 22 and the framework 24. In addition, the PV assembly 300 includes a stiffening device 302 that is transitionable between the deployed state of FIG. 15 and a compact, shipping state as described below.

The stiffening device 302 includes one or more cables 310 and one or more columns 312. In general terms, the cable(s) 310 spans across the length L (FIG. 1B) of the perimeter frame 30, with the column(s) 312 tensioning the cable(s) 310 in the deployed state.

With the one configuration of FIG. 15, two of the cables 310a, 310b are provided. The first cable 310a is attached to, and extends between a corner 314 formed by the first side frame member 50 and the second end frame member 56, and a corner 316 formed by the second side frame member 52 and the first end frame member 54. The second cable 310b is attached to, and extends between, opposing corners 318, 320. The cables 310a, 310b are longitudinally inextensible (e.g., metal wire). With this configuration, when tensioned in the deployed state of FIG. 15, the cables 310a, 310b reinforce a stiffness of the perimeter frame 30.

Figure 16A:
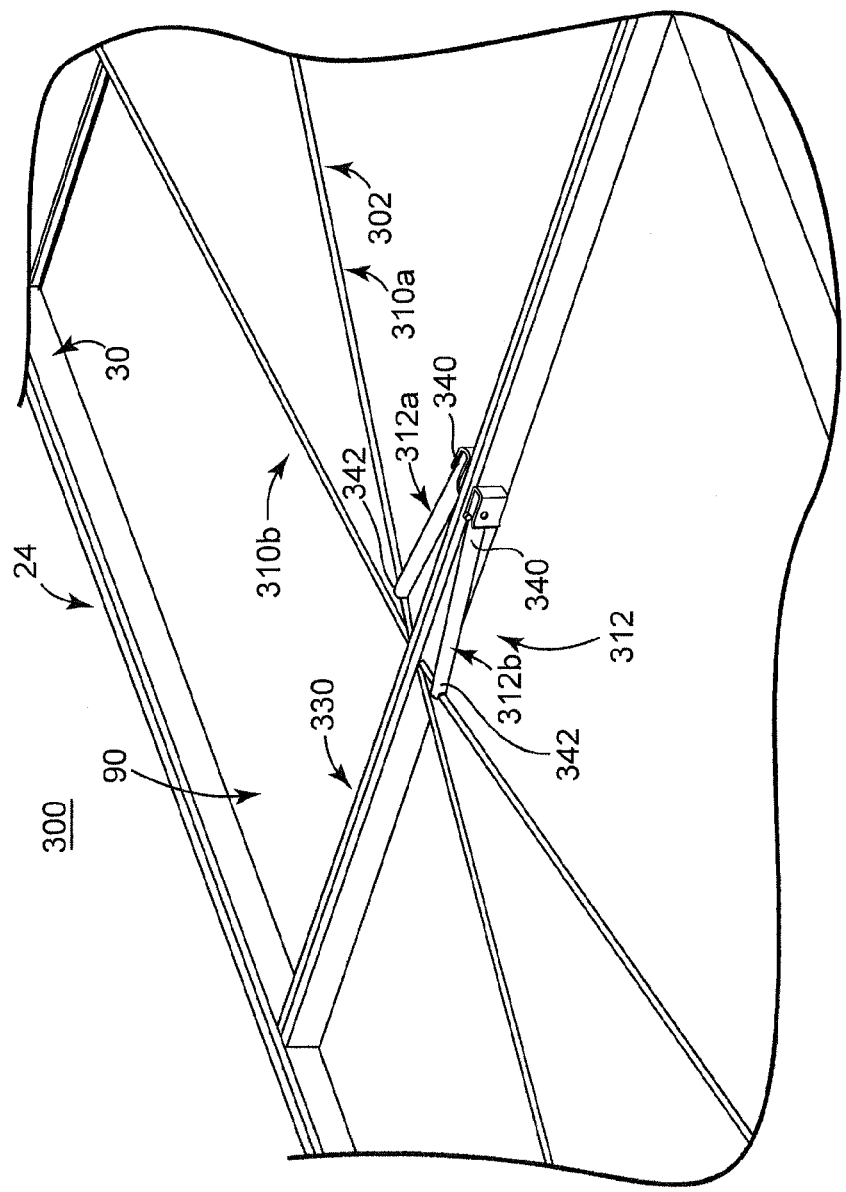
FIG. 16A is an enlarged, rear perspective view of a portion of the photovoltaic assembly of FIG. 15, including the stiffening device in a shipping state.

The columns 312 are shown in greater detail in FIG. 16A and include, in some embodiments, a first column 312a and a second column 312b. The columns 312a, 312b are pivotably coupled to the framework 24, for example along a central cross beam 330. The columns 312a, 312b can assume a variety of forms, and define a pivot end 340 and a free end 342. The pivot end 340 is coupled to the cross beam 330, and the free end 342 is configured to receive a corresponding one of the cables 310a or 310b. For example, the free end 342 can form a notch dimensioned in accordance with a diameter of the corresponding cable 310a or 310b.

As a point of reference, FIG. 16A reflects the stiffening device 302 in a retracted or shipping state. The columns 312a, 312b are pivoted or folded downwardly (relative to the deployed state of FIG. 15), directing or allowing the cables 310a, 310b to reside within the receiving zone 90 of the perimeter frame 30. The cables 310a, 310b can rest on top of the cross beam 330 and/or the cross beam 330 can form a slot or similar opening within which the cables 310a, 310b are received in the shipping state. Regardless, in the shipping state, an entirety of the stiffening device 302 is disposed within the receiving zone 90. In the shipping state, then, the PV assembly 300 is highly amenable to the compact, high shipping density applications described above in the context of conventional cargo shipping containers.

Figure 16B:
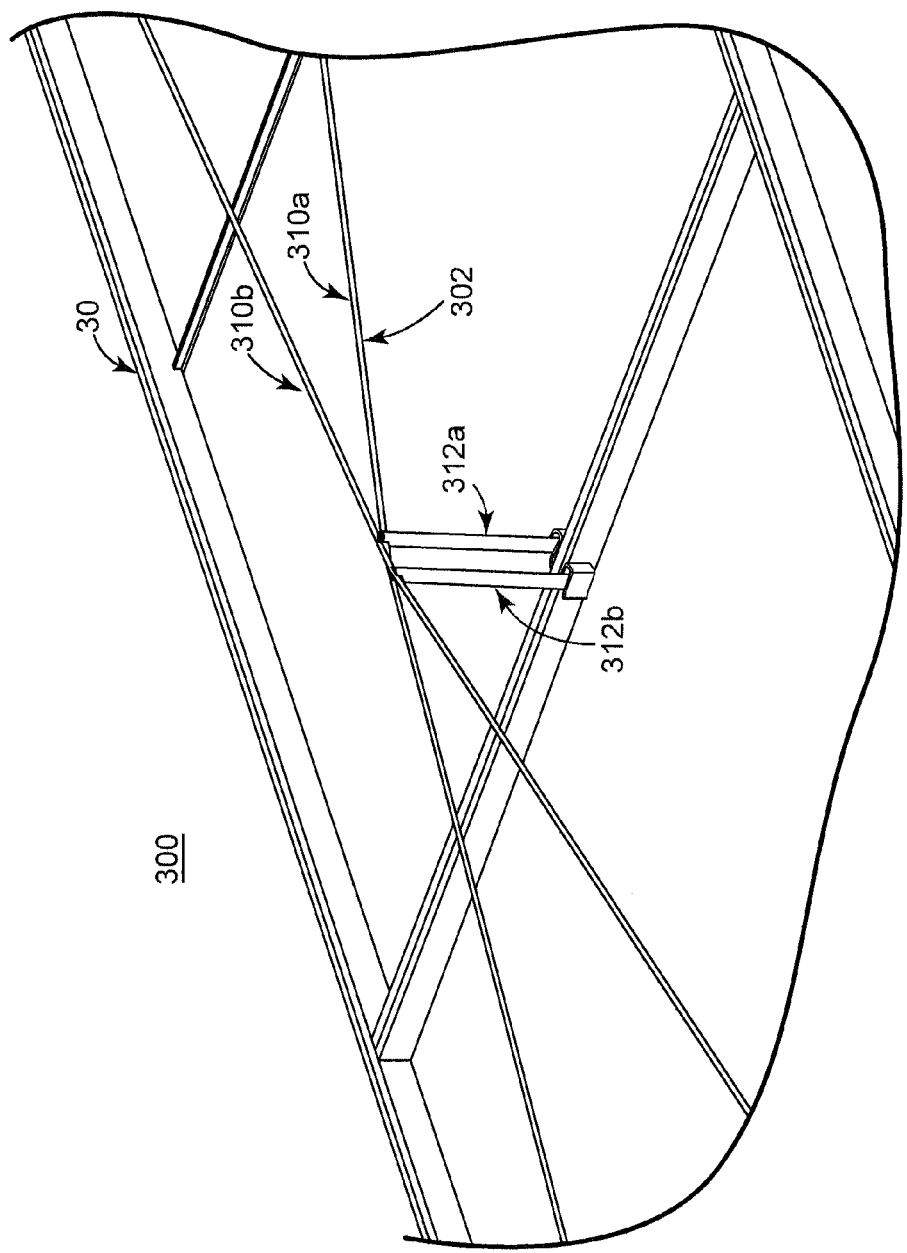
FIG. 16B is an enlarged, rear perspective view of a portion of the photovoltaic assembly of FIG. 15, including the stiffening device in the deployed state.

FIG. 16B illustrates a portion of the stiffening device 302 in greater detail relative to the deployed state. The columns 312a, 312b are unfolded (e.g., the corresponding free ends 342 maneuvered away from the cross beam 330), thereby imparting tension into the cables 310a, 310b. This tension, in turn, reinforces the PV assembly 300 in a plane of the perimeter frame 30. With this construction, the PV assembly 300 is immediately available for final mounting at an installation site as described above.

Figure 17:
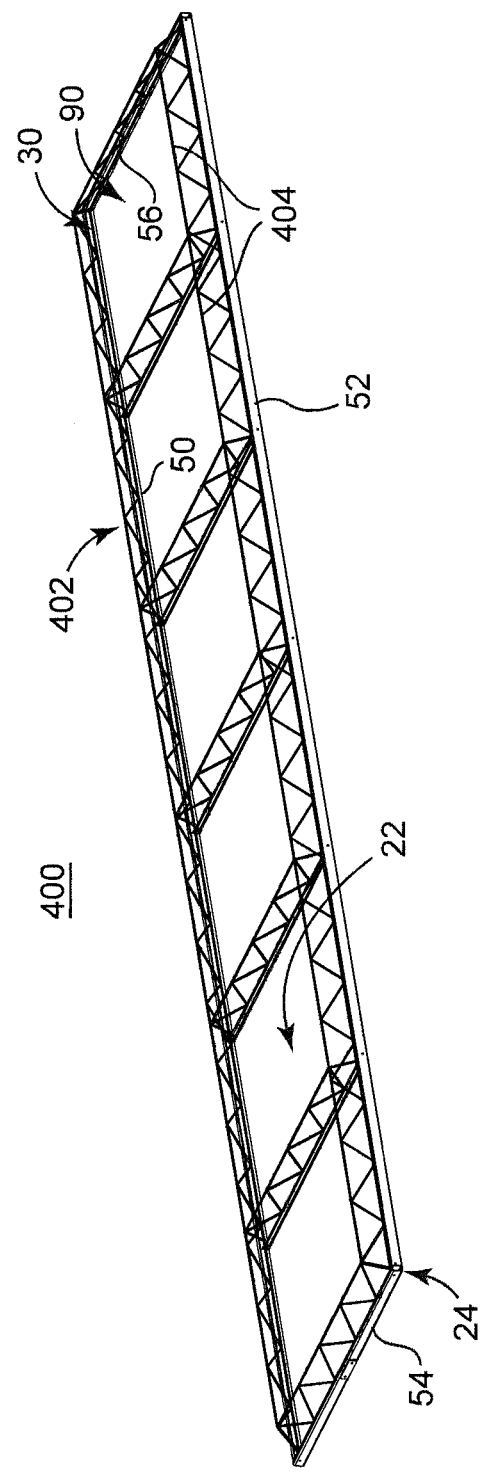
FIG. 17 is a rear perspective view of another photovoltaic assembly in accordance with principles of the present disclosure.

In yet another embodiment PV assembly 400 in accordance with aspects of the present disclosure is shown in FIG. 17, and includes the PV laminate(s) 22 and the framework 24 as described above. In addition, the PV assembly 400 includes a stiffening device 402 coupled to, and transitionable relative to, the perimeter frame 30 between the deployed state as illustrated, and a shipping state as described below.

The stiffening device 402 includes a plurality of stiffening members (e.g., plates) 404 pivotably coupled to respective ones of the perimeter frame members 50-56. In the deployed state of FIG. 17, the stiffening members 404 are interconnected with one another, and define a rigid support to the perimeter frame 30. Conversely, the stiffening members 404 can be pivoted inwardly relative to the perimeter frame 30, and entirely positioned within the receiving zone 90. Thus, in the shipping state, the PV assembly 400 is highly amenable to the compact, high density shipping arrangements described above and useful with conventional cargo shipping container. Following delivery to an installation site, the PV assembly 400 is readily transitioned to the deployed state, and is essentially immediately available for ground mount installation as described above.

The PV assembly and related cargo shipping container arrangements of the present disclosure provide a marked improvement over previous designs. A relatively large span of PV cells are incorporated into a single PV assembly, and thus highly appropriate for large scale solar collection installations. In this regard, the small, relatively uniform footprint associated with the PV assemblies in the shipping state promotes low cost delivery to an installation site via conventional cargo shipping containers, and greatly minimizes the number of transport vehicles required by the installer. Further, the PV assembly is quickly transitioned to the deployed state, and is immediately available for ground mount installation.

Although the present disclosure has been described with reference to preferred embodiments, workers skilled in the art will recognize that changes can be made in form and detail without departing from the spirit and scope of the present disclosure.

What is claimed is:

1. A photovoltaic assembly comprising:
   framework including a perimeter frame defining a length, a width and a height, the perimeter frame including:
     a PV support section having opposing, first and second PV support faces each defining a plane;
   one or more PV laminates assembled to the perimeter frame to collectively define a PV front surface and a PV rear surface, the PV front surface being proximate the first PV support face plane and the PV rear surface being spaced from the second PV support face plane to define a receiving zone bounded by the perimeter frame and the second PV support face plane;
   wherein the receiving zone defines a depth in a direction of the height; and
   a stiffening device associated with the framework and configured to provide:
     a first state in which an entirety of the stiffening device is maintained within the receiving zone,
     a second state in which at least a portion of the stiffening device projects from the receiving zone beyond the second support face plane;
   wherein the second state of the stiffening device enhances a stiffness of the perimeter frame as compared to a stiffness in the first state, wherein the stiffening device includes a plurality of rods that define at least one truss structure in at least the second state, wherein the perimeter frame includes opposing, first and second side frame members defining the length, and opposing, first and second end frame members defining the width, and further wherein the plurality of rods includes:
   a first rod set comprising first and second rods each having a base end and a leading end, wherein the base ends are coupled to the first side frame member in a spaced apart fashion in at least the second state;
   a second rod set comprising first and second rods each having a base end and a leading end, wherein the base ends of the rods of the second rod set are coupled to the second side frame member in a spaced apart fashion in at least the second state;
   wherein in the second state, the leading ends of the rods of the first and second rod sets are coupled to one another, and wherein the first rod set further includes:
   a third rod having a base end and a leading end, and further wherein in at least the second state, the base end of the third rod is coupled to the first side frame member, and the leading end of the third rod is coupled to a support rod immediately adjacent the leading ends of the first and second rods, the support rod interconnecting the leading ends of the first and second rods with the leading end of the third rod;
   wherein the second rod set further includes:
   a fourth rod having a leading end and a base end coupled to the second side frame member in at least the second state at a location spaced from the base end of the second rod in a direction opposite the base end of the first rod; and
   a support rod interconnecting the first and second rods with the leading end of the fourth rod of the second rod set;
   wherein at least some of the base ends are pivotably coupled to the first side frame member such that the rod sets are foldable relative to the framework between the first and second states, and wherein the second rod set nests within the first rod set in the first state, the second side frame member including coupling bodies for receiving the base ends of the second rod set in the second state.

2. The photovoltaic assembly of claim 1, wherein the depth is not more than 5 inches.

3. The photovoltaic assembly of claim 2, wherein the depth is not more than 4 inches.

4. The photovoltaic assembly of claim 3, wherein the length of the perimeter frame is at least 12 feet and the width is at least 6 feet.

5. The photovoltaic assembly of claim 1, wherein the perimeter frame is configured to be stackable between two identical perimeter frames in a stacked arrangement consisting of an upper frame, the perimeter frame, and a lower frame, and further wherein the perimeter frame defines a pitch as a linear distance between a first load bearing surface contacting the upper frame and a second load bearing surface contacting the lower frame, the pitch being not more than 8 inches.

6. The photovoltaic assembly of claim 1, wherein the perimeter frame further includes a skirt section extending from the PV support section and having opposing, first and second reinforcement faces, the first reinforcement face extending between the PV support face planes and the second reinforcement face spaced from the second PV support face plane opposite the first PV support face plane.

7. The photovoltaic assembly of claim 6, wherein an overall height of the perimeter frame is defined between the first PV support face and the second reinforcement face.

8. The photovoltaic assembly of claim 7, wherein the overall height is greater than the depth and is not more than 12 inches.

9. The photovoltaic assembly of claim 6, wherein the PV support section further includes a first nesting face extending from the first PV support face to the first reinforcement face, and the skirt section includes a second nesting face extending from the second reinforcement face to the second PV support face.

10. The photovoltaic assembly of claim 6, wherein a pitch of the perimeter frame is defined as the greater of a linear distance between the first and second PV support faces and a linear distance between the first and second reinforcement faces, the pitch being not more than 8 inches.

11. The photo voltaic assembly of claim 1, wherein the first state of the stiffening device is a shipping configuration in which the photovoltaic assembly is stackable in a cargo shipping container.

12. The photovoltaic assembly of claim 1, wherein the first rod set further includes a fourth rod having a leading end and a base end coupled to the first side frame member in at least the second state at a location spaced from the base end of the second rod in a direction opposite the base end of the first rod.

13. The photovoltaic assembly of claim 1, wherein the plurality of rods are uncoupled from the framework in the first state.

14. A shippable photovoltaic kit comprising:
a plurality of photovoltaic assemblies each comprising:
framework including a perimeter frame defining a length, a width, and a height, the perimeter frame including:
a support section having opposing, first and second PV support faces each defining a plane,
one or more PV laminates assembled to the perimeter frame to collectively define a PV front surface and a PV rear surface, the PV front surface being proximate the first PV support face plane and the PV rear surface being spaced from the second PV support face plane to define a receiving zone bounded by the perimeter frame and the second PV support face plane, the receiving zone having a depth,
a stiffening device associated with the framework and configured to provide:
a first state in which an entirety of the stiffening device is maintained within the receiving zone,
a second state in which at least a portion of the stiffening device projects from the receiving zone beyond the second PV support face plane,
wherein the second state of the stiffening device enhances a stiffness of the perimeter frame as compared to the first state; and
a cargo shipping container sized to contain the plurality of photovoltaic assemblies in a stacked arrangement, wherein the perimeter frame further includes a skirt section having opposing, first and second reinforcement faces, the first reinforcement face extending between the PV support face planes and the second reinforcement face spaced from the second PV support face plane opposite the first PV support face plane, and further wherein the stacked arrangement includes the first reinforcement face of a first photovoltaic assembly in load bearing abutment with the second reinforcement face of a second photovoltaic assembly, and the first reinforcement face of the second photovoltaic assembly in load bearing abutment with the second reinforcement face of a third photovoltaic assembly.

15. The shippable photovoltaic kit of claim 14, wherein the stacked arrangement includes each of the photovoltaic assemblies in the first state and the perimeter frame of adjacent photovoltaic assemblies in abutting contact.

16. The shippable photovoltaic kit of claim 15, wherein the stacked arrangement includes an intermediate photovoltaic assembly located between an immediately upper photovoltaic assembly and an immediately lower photovoltaic assembly, and further wherein a pitch of the intermediate photovoltaic assembly is defined by a linear distance between an upper load bearing surface at which the perimeter frame of the intermediate photovoltaic assembly abuttingly receives and supports the perimeter frame of the upper photovoltaic assembly and a lower load bearing surface at which the perimeter frame of the intermediate photovoltaic assembly is received and supported by the perimeter frame of the lower photovoltaic assembly, the pitch being not more than 8 inches.

17. The shippable photovoltaic kit of claim 16, wherein the depth is less than the pitch.

18. The shippable photovoltaic kit of claim 17, wherein the pitch is not more than 5 inches.

19. The shippable photovoltaic kit of claim 14, wherein the stiffening device of each of the photovoltaic assemblies is foldably coupled to the corresponding perimeter frame.

20. The shippable photovoltaic kit of claim 14, wherein the support section further includes a first nesting face extending from the first PV support face to the first reinforcement face, and the skirt section further includes a second nesting face extending from the second reinforcement face to the second PV support face, and further wherein the stacked arrangement includes the first nesting face of the first photovoltaic assembly abutting the second nesting face of the second photovoltaic assembly, and the first nesting face of the second photovoltaic assembly abutting the second nesting face of the third photovoltaic assembly.

21. The shippable photovoltaic kit of claim 14, wherein the PV laminates include silicon cells, and further wherein the cargo shipping container has an external length in the range of 20-40 feet, and the plurality of photovoltaic assemblies in the cargo shipping container has a collective shipping density of at least 100 kWp.

22. The shippable photovoltaic kit of claim 14, wherein the PV laminates include thin film cells, and further wherein the cargo shipping container has an external length in the range of 20-40 feet, and the plurality of photovoltaic assemblies in the cargo shipping container has a collective shipping density of at least 60 kWp.

* * * * *